(12) United States Patent
Tanaka et al.

(10) Patent No.: US 8,395,321 B2
(45) Date of Patent: Mar. 12, 2013

(54) VEHICLE HEADLAMP CONTROL APPARATUS, VEHICLE HEADLAMP CONTROL SYSTEM AND VEHICLE HEADLAMP, HIGH INTENSITY DISCHARGE LAMP CONTROL APPARATUS, HIGH INTENSITY DISCHARGE LAMP CONTROL SYSTEM AND VEHICLE HEADLAMP

(75) Inventors: Toshifumi Tanaka, Toyonaka (JP); Tomoyuki Nakano, Sakai (JP)

(73) Assignee: Panasonic Corporation, Osaka (JP)

( * ) Notice: Subject to any disclaimer, the term of this patent is extended or adjusted under 35 U.S.C. 154(b) by 591 days.

(21) Appl. No.: 12/373,611

(22) PCT Filed: Jul. 24, 2007

(86) PCT No.: PCT/JP2007/064488
§ 371 (c)(1),
(2), (4) Date: Jan. 13, 2009

(87) PCT Pub. No.: WO2008/013164
PCT Pub. Date: Jan. 31, 2008

(65) Prior Publication Data
US 2009/0267517 A1 Oct. 29, 2009

(30) Foreign Application Priority Data
Jul. 26, 2006 (JP) .................................. 2006-203533

(51) Int. Cl.
*B60Q 1/02* (2006.01)

(52) U.S. Cl. ........................................... 315/82; 315/80

(58) Field of Classification Search ............... 315/76–83
See application file for complete search history.

(56) References Cited

U.S. PATENT DOCUMENTS

| | | | |
|---|---|---|---|
| 4,139,801 A * | 2/1979 | Linares ............................ 315/83 |
| 5,536,975 A * | 7/1996 | Jennings ...................... 307/10.8 |
| 5,923,125 A * | 7/1999 | Endo ................................ 315/82 |
| 6,049,171 A * | 4/2000 | Stam et al. ...................... 315/82 |
| 7,241,028 B2 * | 7/2007 | Hasumi .......................... 362/276 |
| 2005/0192726 A1 | 9/2005 | Okura et al. | |
| 2008/0029701 A1 | 2/2008 | Onozawa et al. | |

FOREIGN PATENT DOCUMENTS

| | | |
|---|---|---|
| CN | 1094802 | 11/1994 |
| DE | 19949896 | 1/2001 |
| DE | 102004008063 | 9/2005 |
| EP | 0830982 | 3/1998 |

(Continued)

OTHER PUBLICATIONS

English language Abstract of JP 2000-43638, Feb. 15, 2000.
English language Abstract of JP 11-91437, Apr. 6, 1999.
English language Abstract of JP 2006-7988, Jan. 12, 2006.

(Continued)

*Primary Examiner* — Crystal L Hammond
(74) *Attorney, Agent, or Firm* — Greenblum & Bernstein, P.L.C.

(57) ABSTRACT

In vehicle headlamp control apparatuses, which receive a direct current voltage Es, light discharge lamps by square waves, and drive motors, in each of which the number is at least one, arithmetic operations are performed for synchronizing the square waves for lighting the discharge lamps and pulses for driving the motors with each other and for driving the motors within a substantially constant time after polarities of the square waves for lighting the discharge lamps are inverted. By using an inexpensive microcomputer, the vehicle headlamp control apparatuses make it possible to realize lighting controls for the discharge lamps and smooth drive controls for headlamps and auxiliary lamps by the motors for varying optical axes thereof.

28 Claims, 27 Drawing Sheets

FOREIGN PATENT DOCUMENTS

| | | |
|---|---|---|
| JP | 4-271934 | 9/1992 |
| JP | 5-254370 | 10/1993 |
| JP | 11-91437 | 4/1999 |
| JP | 2000-43638 | 2/2000 |
| JP | 2002-178829 | 6/2002 |
| JP | 2002-352978 | 12/2002 |
| JP | 2003-159989 | 6/2003 |
| JP | 2004-355833 | 12/2004 |
| JP | 2005-319884 | 11/2005 |
| JP | 2006-7987 | 1/2006 |
| JP | 2006-7988 | 1/2006 |

OTHER PUBLICATIONS

English language Abstract of JP 2005-319884, Nov. 17, 2005.
English language Abstract of JP 5-254370, Oct. 5, 1993.
English language Abstract of JP 2004-355833, Dec. 16, 2004.
English language Abstract of JP 2002-178829, Jun. 26, 2002.
English language Abstract of JP 2003-159989, Jun. 3, 2003.
English language Abstract of JP 2006-7987, Jan. 12, 2006.
Japan Office action, dated Sep. 6, 2011 along with an english translation thereof.
Search report from E.P.O., mail date is Sep. 27, 2012.

\* cited by examiner

FIG. 18

| LIGHTING SQUARE WAVE FREQUENCY (Hz) | 300 | 500 | 700 | 900 | 1000 |
|---|---|---|---|---|---|
| DRIVE PULSE FREQUENCY: n=1 (Hz) | 600 | 1000 | 1400 | 1800 | 2000 |
| DRIVE PULSE FREQUENCY: n=2 (Hz) | 300 | 500 | 700 | 900 | 1000 |
| DRIVE PULSE FREQUENCY: n=3 (Hz) | 200 | 333 | 467 | 600 | 667 |
| DRIVE PULSE FREQUENCY: n=4 (Hz) | 150 | 250 | 350 | 450 | 500 |
| DRIVE PULSE FREQUENCY: n=5 (Hz) | 120 | 200 | 280 | 360 | 400 |
| DRIVE PULSE FREQUENCY: n=6 (Hz) | 100 | 167 | 233 | 300 | 333 |
| DRIVE PULSE FREQUENCY: n=7 (Hz) | 86 | 143 | 200 | 257 | 286 |
| DRIVE PULSE FREQUENCY: n=8 (Hz) | 75 | 125 | 175 | 225 | 250 |

VEHICLE HEADLAMP CONTROL APPARATUS, VEHICLE HEADLAMP CONTROL SYSTEM AND VEHICLE HEADLAMP, HIGH INTENSITY DISCHARGE LAMP CONTROL APPARATUS, HIGH INTENSITY DISCHARGE LAMP CONTROL SYSTEM AND VEHICLE HEADLAMP

TECHNICAL FIELD

The present invention relates to a vehicle headlamp control apparatus and a high intensity discharge lamp control apparatus, which simultaneously control a high intensity discharge lamp (HID lamp) and other loads (for example, a motor, a communication device, other light sources, a sensor and the like), relates to a vehicle headlamp control system and a high intensity discharge lamp control system, which include the vehicle headlamp control apparatus and the high intensity discharge lamp control apparatus, and relates to a vehicle headlamp.

BACKGROUND ART

In recent years, in the field of the high intensity discharge lamp lighting device, a high intensity discharge lamp control system with such a high function that moves, for example, a spotlight and the like by an actuator has been examined while the conventional apparatus only lights a lamp in response to ON/OFF of a power switch.

In particular, in the field of the vehicle headlamp, a vehicle that mounts thereon a high intensity discharge lamp (hereinafter, referred to as an HID lamp) as a load has been widespread, and a vehicle headlamp lighting device (HLB: head light ballast) that lights the HID lamp has also been being widespread. Moreover, in recent years, a vehicle that mounts thereon a control ECU (electronic control unit) that drives the headlamp or an auxiliary lamp up and down and left and right in response to vehicle information such as a steering angle and a vehicle speed has also been started to be widespread.

Heretofore, the lighting device of the vehicle HID lamp has started to operate by ON/OFF of the power switch located close to the hand of a driver, and lights the HID lamp by using a square wave after the HID lamp is started. In this event, as described in Japanese Patent Laid-Open Publication No. 2004-355833, since a voltage and current of the lamp are unstable at the time when a polarity of the square wave is inverted and for a predetermined time, a period (sample hold time) while the voltage and the current are not being detected and a control for constantly maintaining the power is not being performed is provided. Specifically, during this period, a load on a microcomputer that performs the control for constantly maintaining the power is small.

Moreover, in recent years, as described in Japanese Patent Laid-Open Publication No. 2002-178829 and Japanese Patent Laid-Open Publication No. 2003-159989, there has been a technology in which, separately from the lighting device of the HID lamp, an ECU that starts to operate by operating an ignition switch or an accessory switch (alternatively, always operates by direct connection to a battery) and drives the headlamp or the auxiliary lamp is provided in the vicinity of the headlamp, in a vehicle cabin or in the like. The drive of the headlamp or the auxiliary lamp affects visibility at night, and accordingly, a control for a motor that drives the headlamp or the auxiliary lamp is performed extremely complicatedly. Microcomputers are used individually for the lighting device and the ECU in order to realize the above-described control.

Configurations of these components are shown in FIG. 27 and FIG. 28. In these diagrams, reference symbols M1 and M3 denote optical axis varying motors of a left lamp body, reference symbols M2 and M4 denote optical axis varying motors of a right lamp body, reference symbol La1 denotes an HID lamp of the left lamp body, and reference symbol La2 denotes an HID lamp of the right lamp body. Reference symbols HLB1 and HLB2 denote headlamp lighting devices, and upon being supplied with power Es by a switch located close to the hand of the driver, the headlamp lighting devices HLB1 and HLB 2 light the lamps La1 and La2. Reference symbols W1, W2, W3 and W3 denote bundles of wire harnesses for driving the respective motors.

In a first conventional example of FIG. 27, an ECU in the vehicle cabin obtains the information on the vehicle speed and the steering angle by a vehicle network (CAN communication line) represented, for example, by CAN (controlled area network) and the like. The ECU drives the headlamps or the auxiliary lamps up and down or left and right based on the information on the vehicle speed and the steering angle. With regard to the lighting of the headlamps, the HID lamps are lighted by the switch located close to the hand of the driver.

In a second conventional example of FIG. 28, an ECU in the vehicle cabin obtains the information on the vehicle speed and the steering angle by a vehicle network. The ECU arithmetically operates target positions for driving the headlamps or the auxiliary lamps, target angles of optical axes, and the like based on the information on the vehicle speed and the steering angle, and communicates with individual ECU1 and ECU2 on the left and right lamp body sides through a local communication line (for example, LIN (local interconnect network)) different from the above-described network. The individual ECU1 and ECU2 on the left and right lamp body sides drive the headlamps or the auxiliary lamps up and down or left and right based on such information thus obtained. In a similar way to the first conventional example, with regard to the lighting of the headlamps, the HID lamps are lighted by the switch located close to the hand of the driver.

Note that, in Japanese Patent Laid-Open Publication No. 2006-7987, a configuration is disclosed, in which the lighting device of the HID lamp and the ECU that drives the headlamp or the auxiliary lamp are integrated with each other.

However, in the configurations of FIG. 27 and FIG. 28, the lighting devices of the HID lamps and the controlling microcomputers for the respective ECUs become necessary. Accordingly, in each of the configurations, total cost of a front module is increased. In this connection, it is considered to reduce the total cost by integrating the lighting devices and the ECU with each other in terms of control. However, the lighting device of each HID lamp performs a fine feedback control for the lamp power so as not to give flickering of light to the driver. Meanwhile, each ECU that varies a light distribution in response to the steering angle is required to perform a communication control, acquisition of vehicle information by A/D conversion, and a smooth motor control so as to give more safe and comfortable visibility to the driver. Both of the power feedback control and the motor control largely affect the visibility of the driver, real time performance is required for each thereof, and a major part of the performance of each microcomputer is occupied for controlling these factors. Therefore, it has been extremely difficult for one microcomputer to realize the feedback control for the lamp power and the control for the motor.

Moreover, though such a vehicle headlamp control apparatus is shown here, a similar problem is inherent also in the case of realizing, by one microcomputer, a lighting control for an HID lamp for common illumination, such as a spotlight and a downlight, and a control for varying a light distribution thereof.

The present invention has been made in consideration for the above-described points. It is an object of the present invention to make it possible to realize, by an inexpensive microcomputer, the lighting control for the discharge lamp, other communication controls, and the smooth drive control for the headlamp or the auxiliary lamp by moving the motor.

DISCLOSURE OF THE INVENTION

The present invention is a high intensity discharge lamp lighting device that receives a direct current voltage and lights a high intensity discharge lamp by a square wave. In order to solve the above-described problems, the high intensity discharge lamp lighting device includes: means for performing a drive control for at least one load other than the high intensity discharge lamp, wherein the control for the load is synchronized with the square wave for lighting the high intensity discharge lamp.

BRIEF DESCRIPTION OF THE DRAWINGS

FIG. 18 is a table showing relationships between inversion frequencies of a lamp voltage and a lamp current and drive pulse frequencies of a motor.

BEST MODE FOR CARRYING OUT THE INVENTION

First Embodiment

Figure 1:
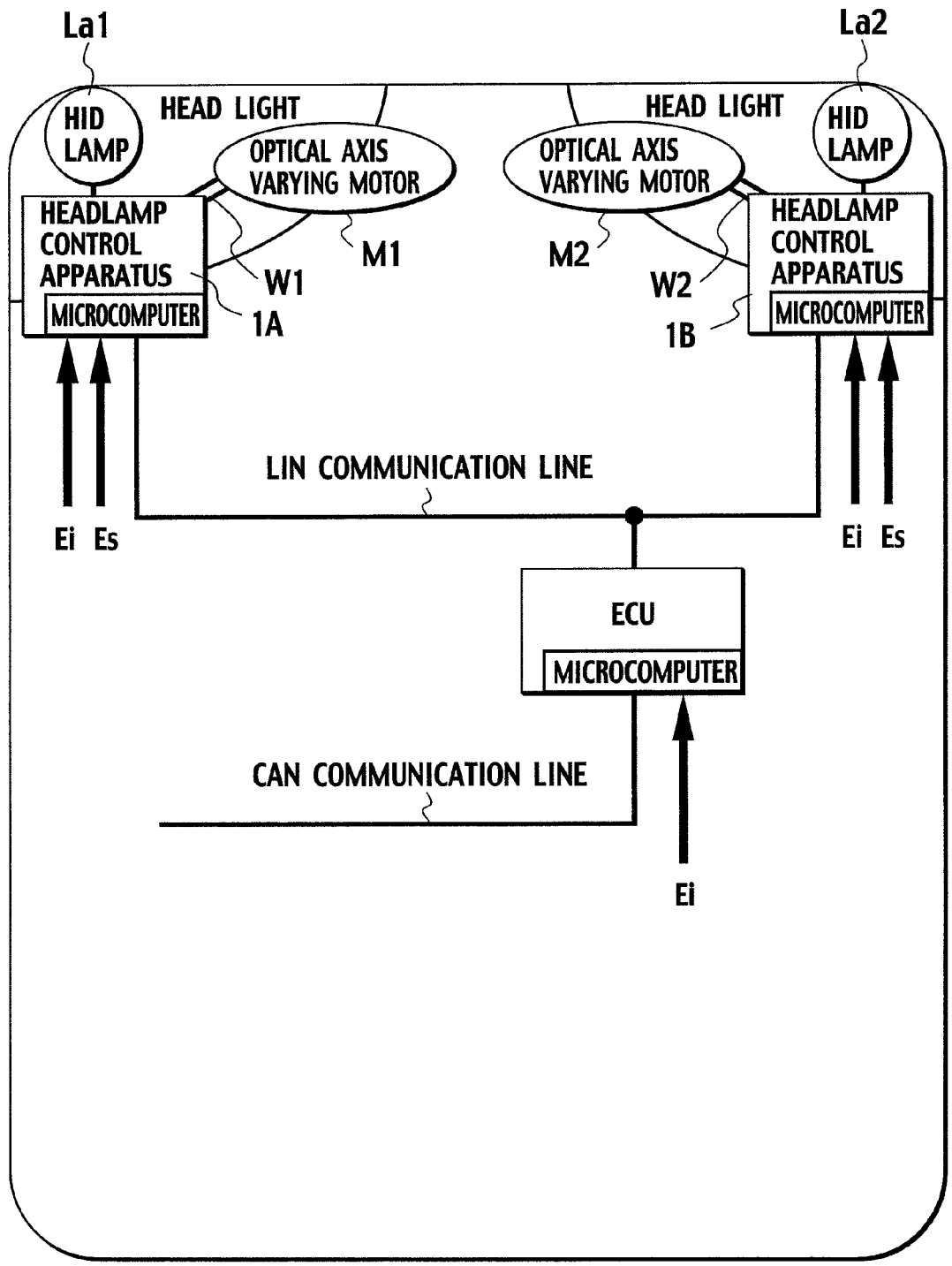
FIG. 1 is an entire configuration diagram of a vehicle headlamp control system of a first embodiment of the present invention.

In FIG. 1, an entire configuration diagram of a vehicle headlamp control system according to a first embodiment to which the present invention is applied is shown.

Figure 28:
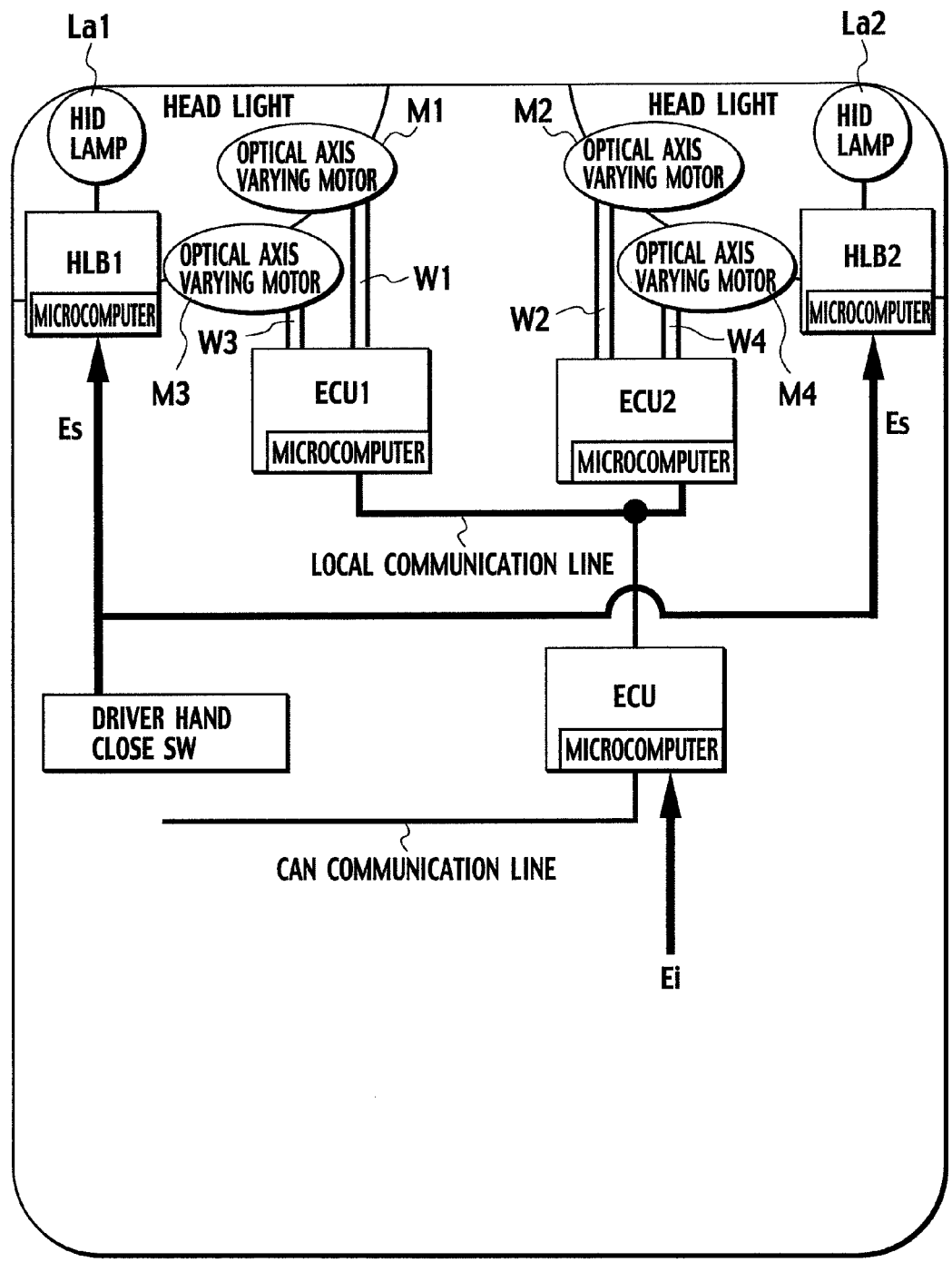
FIG. 28 is a configuration diagram of a second conventional example.

In comparison with the second conventional example shown in FIG. 28, the headlamp lighting devices HLB1 and HLB2 and the motor controlling ECU1 and ECU2 are integrated with headlamp control apparatuses 1A and 1B (hereinafter, simply referred to as "headlamp control apparatuses 1" in the case of being generically called). The headlamp control apparatuses 1A and 1B control motors M1 and M2 (hereinafter, simply referred to as "motors M" in the case of being generically called) which drive optical axes of left and right headlamps, and control HID lamps La1 and La2 (hereinafter, simply referred to as "HID lamps La" in the case of being generically called). The headlamp control apparatuses 1 receive, as power, both of power Es by a switch close to the hand of a driver and ignition power Ei linked with an ignition switch. The headlamp control apparatuses 1 are connected to the LIN communication line through which control data has been inputted to the motor controlling ECU1 and ECU2 in the second conventional example.

In FIG. 1, the case is shown, where the headlamp-driving motors M1 and M2 are provided separately on left and right lamp bodies. However, the headlamp control apparatuses 1 which realize lighting of the HID lamps La and drive of the motors, the lighting and the drive being to be described later, are also applicable to the case where the motor becomes plural for each of the left and right lamp bodies, and it is needless to say that it is also easy for each of the headlamp control apparatuses 1 to drive two motors M in a similar way to the first conventional example and the second conventional example.

Figure 2:
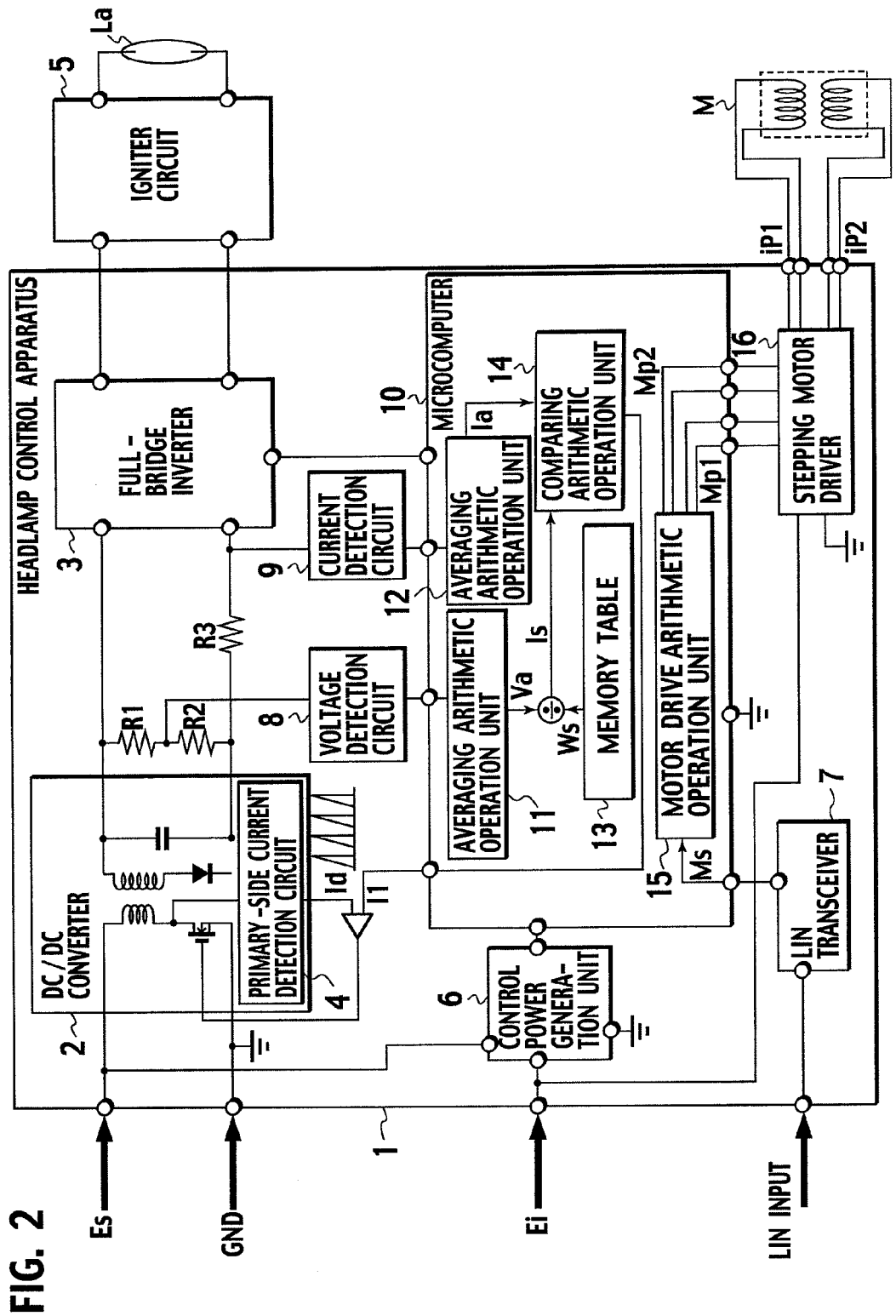
FIG. 2 is a circuit block diagram of a headlamp control apparatus for use in the first embodiment of the present invention.

In FIG. 2, a circuit block diagram of each headlamp control apparatus 1 in this embodiment is shown. A configuration becomes similar between the headlamp control apparatuses 1A and 1B of the left lamp body and the right lamp body. A DC/DC converter 2 boosts and drops a direct current voltage, which is supplied from the power supply Es turned ON/OFF in response to an operation of a low beam switch, to a voltage that allows the lamp La to be lighted. The DC voltage as an output voltage of the DC/DC converter 2 is converted into an AC voltage (square wave) by a full-bridge inverter 3, and is applied to the Lamp La. In such a way, the HID lamp La is lighted. In this example, the HID lamp La is a high intensity discharge lamp (HID lamp). An igniter circuit 5 provided between the full-bridge inverter 3 and the HID lamp La generates a high voltage for breaking down the HID lamp La at the time of starting the HID lamp La.

The headlamp control apparatus 1(A) of this embodiment lights the HID lamp La by a constant power control. This constant power control for the HID lamp La is performed by a microcomputer 10. The headlamp control apparatus 1(A) detects values of a lamp voltage and a lamp current by resistors R1 to R3. These lamp voltage and lamp current are inputted to the microcomputer 10 through a voltage detection circuit 8 and a current detection circuit 9, which are composed of operational amplifiers and the like. The microcomputer 10 averages the lamp voltage and the lamp current by averaging arithmetic operation units 11 and 12. The microcomputer 10 calculates a lamp current command value Is by using a lamp power command value Ws stored in a memory table 13 on a ROM and using an averaged voltage value Va. Moreover, the microcomputer 10 compares the lamp current command value Is and an averaged lamp current Ia with each other by a comparing arithmetic operation unit 14, arithmetically operates a primary-side current command value I1 so that both of the lamp current command value Is and the averaged lamp current Ia can take the same value, and outputs the primary-side current command value I1. A primary-side current detection value Id detected by a primary-side current detection circuit 4 is compared with the primary-side current command value I1. In accordance with a result of this comparison, the DC-DC converter 2 is driven. In such a manner as described above, the headlamp control apparatus 1(A) realizes the constant power control.

Note that power for operating the microcomputer 10 is generated in a control power generation unit 6. A configuration is adopted, in which power to the control power generation unit 6 is supplied from both of the power supply Es turned ON/OFF by the operation of the low beam switch and the ignition power supply Ei. In such a way, even in the case where the low beam switch is not operated to be ON, the headlamp control apparatus 1A can drive the microcomputer 10 as long as the ignition is operated to be ON, and even in a state where the ignition is not operated to be ON, the headlamp control apparatus 1A makes it possible to light the HID lamp La in such a manner that the low beam switch is operated to be ON.

Figure 4:
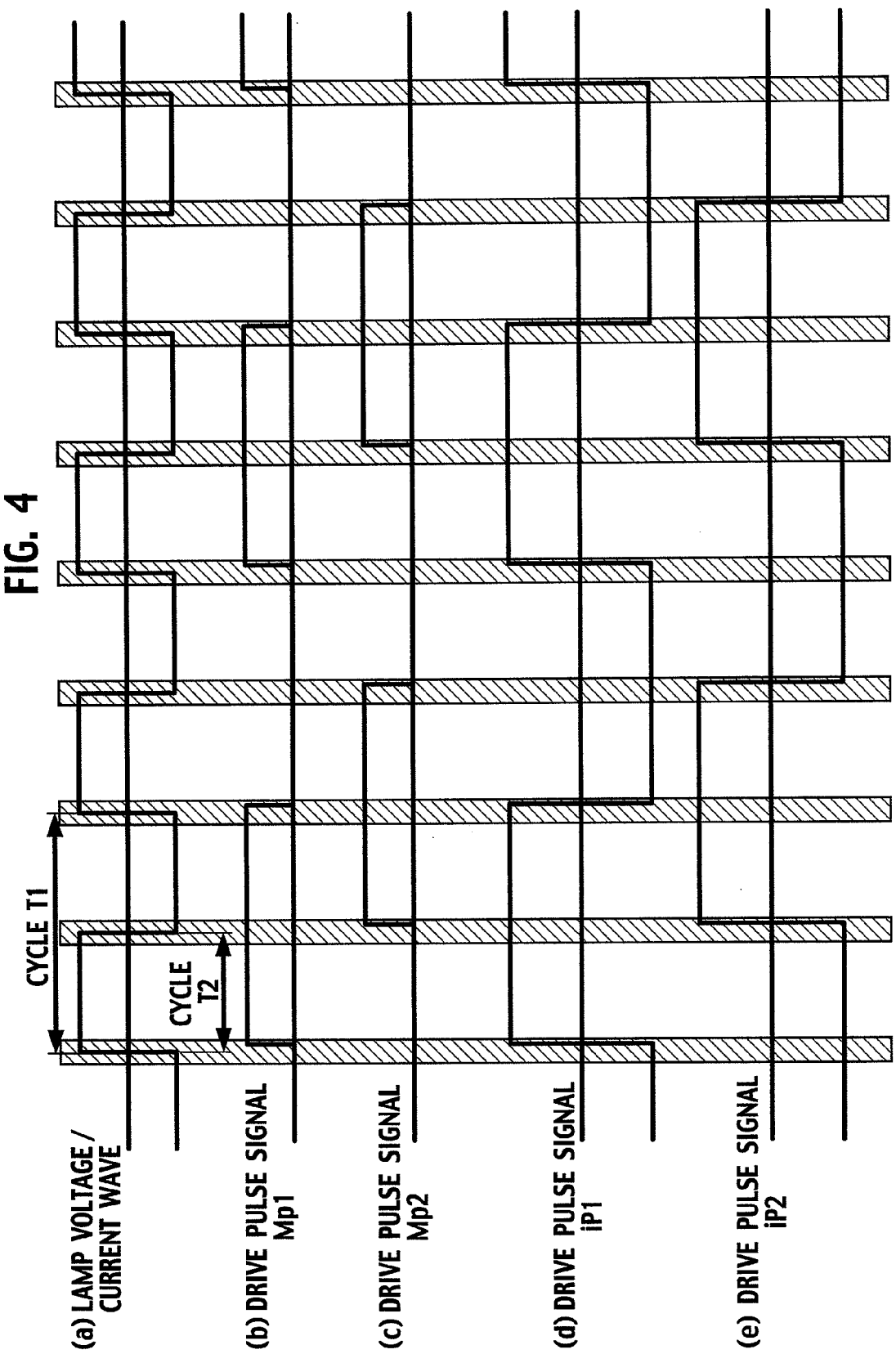
FIG. 4 is a waveform chart for explaining operations of the first embodiment of the present invention.

Moreover, in the headlamp control apparatus 1(A), a LIN input is inputted to the microcomputer 10 through a LIN transceiver 7. The microcomputer 10 acquires information on a motor target position Ms in the LIN input, and arithmetically operates drive pulse signals by a motor drive arithmetic operation unit 15. The drive pulse signals Mp1 and Mp2 are outputted to a stepping motor driver 16. Based on the drive pulse signals Mp1 and Mp2, the stepping motor driver 16 outputs drive pulse currents iP1 and iP2 to the motor M, and drives the motor M. Note that, as shown in FIG. 4, the drive pulse signals Mp1 and Mp2 are composed of two HIGH/LOW signals as shown in FIGS. 4B and 4C, the drive pulse currents iP1 and iP2 for the motor M are also two channels as shown in FIGS. 4D and 4E, and each of the drive pulse signals and each of the drive pulse currents has a one-to-one correspondence relationship therebetween.

Figure 3:
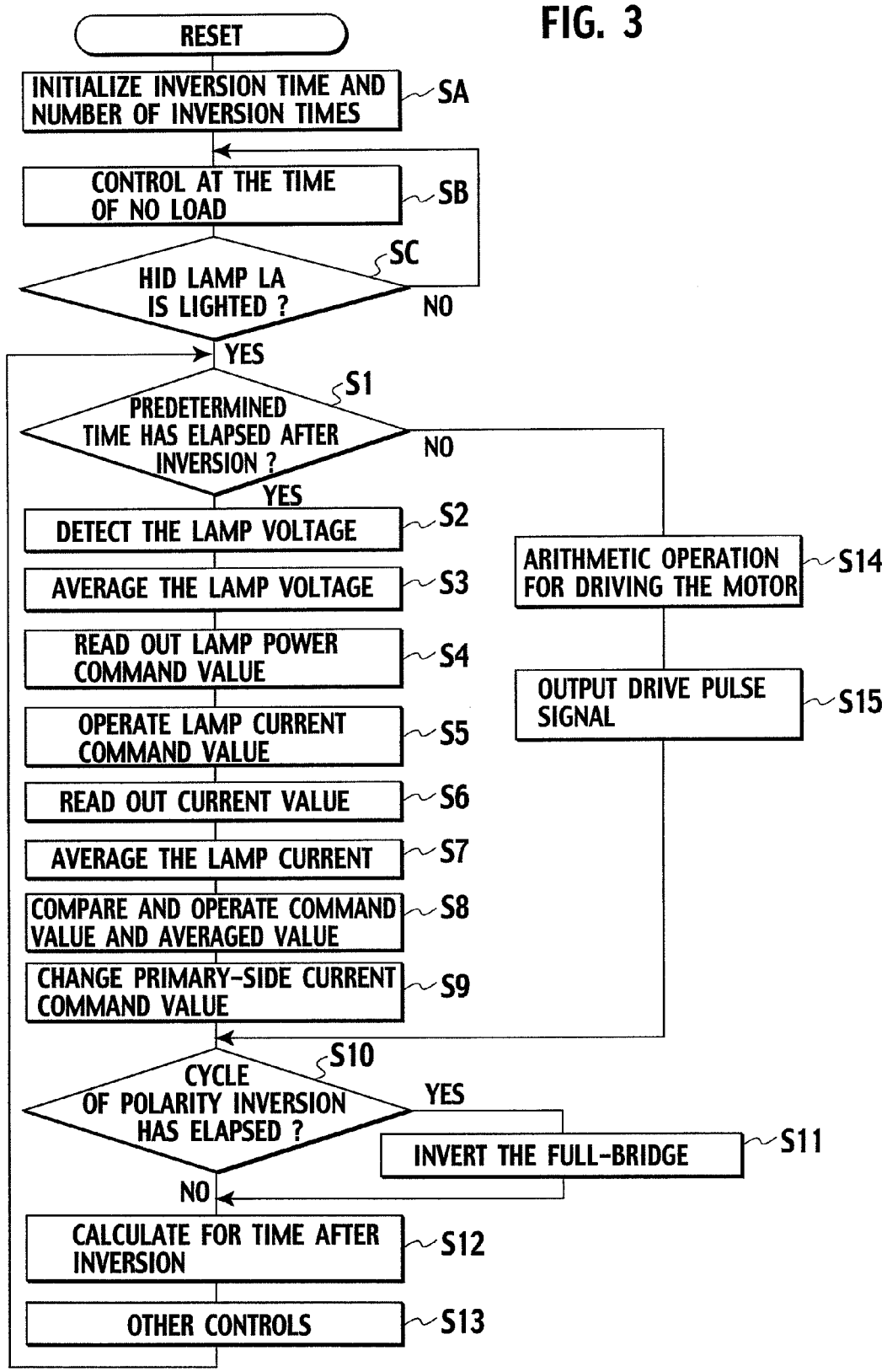
FIG. 3 is a flowchart showing microcomputer operations of the first embodiment of the present invention.

In FIG. 3, a control flow of the microcomputer 10 that performs the constant power control for the HID lamp La and the drive of the motor M is shown.

Explanations of the respective steps in this chart are shown below.

In Step SA, at the time of RESET by turning ON the power, variables in the microcomputer 10, such as an inversion time and the number of inversion times, are initialized.

In Step SB, a control at the time of no load before lighting the HID lamp La is set.

In Step SC, it is determined whether or not the HID lamp La is lighted. In the case where the HID lamp La is not lighted, such control processing returns to Step SB. In the case where the HID lamp La is lighted, the processing proceeds to the following loop for performing the constant power control for the HID lamp La.

In Step S1, it is determined whether or not a predetermined time has elapsed since a polarity of the square wave was inverted. In the case where such determination timing is within the predetermined time, processing of Steps S14 and S15 is performed without performing processing of Steps S2 to S9.

In Step S2, the averaging arithmetic operation unit 11 of the microcomputer 10 performs A/D conversion for the value detected by the voltage detection circuit 8, and thereby reads the lamp voltage.

In Step S3, the averaging arithmetic operation unit 11 of the microcomputer 10 averages the lamp voltage by using the read value and past values of the lamp voltage, and thereby calculates the averaged voltage value Va. An example of such averaging is mentioned below. Three detection values counted from the latest value are stored in advance (these values are updated when the lamp voltage is read next time), and when the next latest value is read, the latest value is added up to the above-described three values, and then the obtained sum is divided by four.

In Step S4, the lamp power command value Ws at that point of time is read out from the memory table 13 provided in the microcomputer 10. In Step S5, the lamp current command value Is is arithmetically operated by a calculation formula represented by: lamp power command value Ws/averaged voltage value Va.

In Step S6, the averaging arithmetic operation unit 12 of the microcomputer 10 performs the A/D conversion for the value detected by the current detection circuit 9, and thereby reads the lamp current.

In Step S7, the averaging arithmetic operation unit 12 of the microcomputer 10 performs such averaging as described above by using the read value and past values of the lamp current, and thereby calculates the averaged current value Ia.

In Step S8, the comparing arithmetic operation unit 14 of the microcomputer 10 compares the lamp current command value Is and the averaged lamp current Ia with each other, and arithmetically operates the primary-side current command value I1.

In Step S9, the primary-side current command value I1 is changed based on a result of the comparison by the comparing arithmetic operation unit 14.

In Step S10, the microcomputer 10 determines whether or not a cycle of polarity inversion has elapsed from the time of the last polarity inversion of the full-bridge inverter 3. In the case of having determined that the cycle of the polarity inversion has elapsed from the time of the last polarity inversion, the microcomputer 10 advances the processing to Step S11, and in the case of having determined that the cycle of the polarity inversion has not elapsed from the time of the last polarity inversion, the microcomputer 10 advances the processing to Step S12.

In Step S11, since the cycle of the polarity inversion has elapsed, the microcomputer 10 issues an inversion command to the full-bridge inverter 3. In Step S12, the microcomputer 10 performs a calculation for a time after the polarity inversion.

In Step S13, other controls are performed.

In Step S14, the microcomputer 10 performs an arithmetic operation for driving the motor M. The arithmetic operation for driving the motor M stands for an arithmetic operation performed in the following procedure. Specifically, through the LIN communication line, the motor drive arithmetic operation unit 15 of the microcomputer 10 receives the target position Ms of the motor M through the LIN transceiver 7, compares the target position Ms and the current position with each other, and determines whether the motor M rotates forward or backward, and subsequently, arithmetically operates a next excitation pattern based on whether the motor M rotates forward or backward.

In Step S15, the motor drive arithmetic operation unit 15 of the microcomputer 10 outputs the drive pulse signals Mp1 and Mp2 so that the excitation pattern decided by the arithmetic operation of Step S14 can be established. Note that Steps S14 and S15 are implemented only once for one polarity inversion of the square wave for lighting the discharge lamp.

In accordance with this embodiment, a square wave frequency for the high intensity discharge lamp and the drive pulse of the motor M can be synchronized with each other. In such a way, by using an idle time (extra arithmetic operation capability of the microcomputer 10) while a time has been being awaited owing to the sample holding after the polarity inversion of the full-bridge inverter 3 in the conventional constant power control (Patent Document 1), the arithmetic operation for the drive of the motor M and the output of the drive signal can be realized.

Examples of output waveforms are shown in FIG. 4. As shown by time ranges of hatched portions in this chart, the inversions of the square wave (of the lamp voltage or the lamp current) and the inversions of the drive current of the motor M are synchronized with each other. The cycle of the square wave for lighting the high intensity discharge lamp is a cycle T1 as shown in FIG. 4A, and accordingly, the square wave frequency is represented as 1/T1. The cycle of the current for driving the motor M is a cycle T2 in FIG. 4, and accordingly, the frequency of the drive pulse of the motor M is represented as 1/T2.

In such a way, an arithmetic operation load can be temporally divided between the constant power control for the high intensity discharge lamp and the drive control for the motor M, both of which are required as functions of the microcomputer 10. Then, it becomes possible to make both of the controls compatible with each other without increasing the microcomputer 10 to a plurality in number or enhancing performance of the microcomputer 10.

Figure 5:
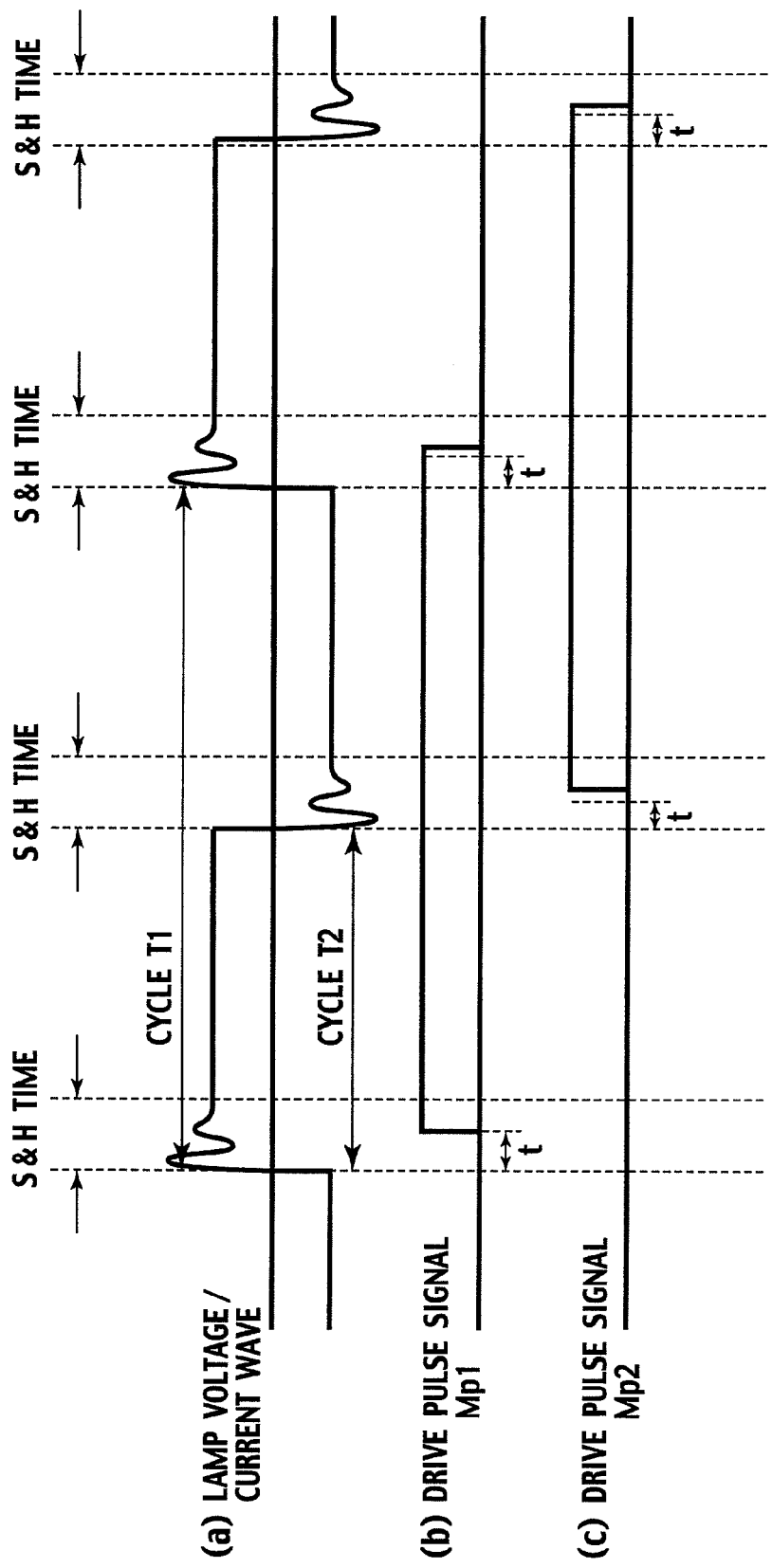
FIG. 5 is a waveform chart showing an enlarged main portion of FIG. 4.

Moreover, in the case where the operations at the time when the polarity of the square wave is inverted are described in detail as shown in FIG. 5, the polarity inversions (a) of the square wave for lighting the high intensity discharge lamp and the outputs (b) and (c) of the drive pulse signals Mp1 and Mp2 of the motor M do not completely coincide with each other, but a time lag occurs by the arithmetic operation for driving the motor M in Step S14. As the arithmetic operation for driving the motor M, there are: communication (transmission/reception of vehicle information such as a vehicle speed and a steering angle and vehicle outside information such as illuminance); capturing of a sensor value of a vehicle height sensor or the like; an arithmetic operation of a changed angle of the steering angle; an arithmetic operation of a motor drive target position; an arithmetic operation of a drive frequency; an arithmetic operation of a current motor position; and the like. In each of these arithmetic operations, an arithmetic operation time is changed depending on whether the vehicle is running or being stopped or whether it is a time when the motor M starts to drive or is being stopped.

In this embodiment, with regard to the polarity inversion of the square wave for lighting the high intensity discharge lamp, the control is described, in which the polarity is inverted while measuring the time. However, it is also considered to utilize an interrupt control of the microcomputer 10 as means for enhancing accuracy of such inversion timing. However, even if the interrupt control is used, variations of the above-described arithmetic operation time become variations of the drive pulse frequency of the motor M. In this connection, the above-described arithmetic operation time is set equal to the longest time in the respective situations (a command of timing awaiting is added to a code with a short time). In such a way, even in the case where the arithmetic operation time for driving the motor differs from others, the drive pulse signals can be switched after the elapse of the same time from the inversions of the lamp voltage/lamp current (square waves), thus making it possible to reduce the variations of the drive pulse frequency.

For a sample hold time (S&H time) at the time of the square-wave lighting of the high intensity discharge lamp, several hundred microseconds are required after the polarity inversions of the lamp voltage and the lamp current (square waves). Accordingly, even if the above-described arithmetic operation is performed, the arithmetic operation can be ended within the sample hold time. Specifically, as shown in FIG. 5, during each sample hold time while the arithmetic operation processing capability of the microcomputer for controlling the lighting of the high intensity discharge lamp is being left, an arithmetic operation time t for driving the motor is provided, and the drive pulse signal is switched actually.

In this embodiment, the microcomputer 10 is shown, which obtains the target position through the LIN communication line by the arithmetic operation of Step S14. However, the microcomputer 10 may be one that drives the motor M by obtaining the vehicle speed and the steering angle by the CAN communication line. Note that, needless to say, for the microcomputer 10, such processing for arithmetically operating the target position of the motor M based on the signals of the vehicle speed and the steering angle is also required.

Moreover, in this embodiment, the microcomputer 10 is shown, which obtains the target position through the LIN communication line by the arithmetic operation of Step S14. However, the microcomputer 10 may be one that drives the motor M by obtaining the vehicle height information from the vehicle height sensor. Note that, also in this case, it is needless to say that, for the microcomputer 10, such processing for arithmetically operating the target position of the motor M based on the information on the vehicle height is also required. Moreover, it is further desirable that the information on the vehicle speed and the like be added to the above-described information by the CAN communication, the LIN communication or the like, the obtained sum be arithmetically operated, and the motor M be thereby driven.

In this embodiment, it is only described that the motor M is driven, and applications thereof are not shown. However, the following achieved by driving the motor M is assumed: "to move an irradiation range of the headlamp up and down"; "to move an irradiation range of the headlamp or the auxiliary lamp left and right"; "to move the irradiation range of the headlamp or the auxiliary lamp up and down and left and right by controlling the plurality of motors M"; and the like.

Moreover, contents of the lamp power control by the microcomputer 10 are not limited to those illustrated here.

Second Embodiment

Next, a description is made of a second embodiment to which the present invention is applied. Note that the same reference numerals and the same step numbers are assigned to the same portions as those of the above-mentioned first embodiment, whereby a detailed description thereof is omitted.

Figure 6:
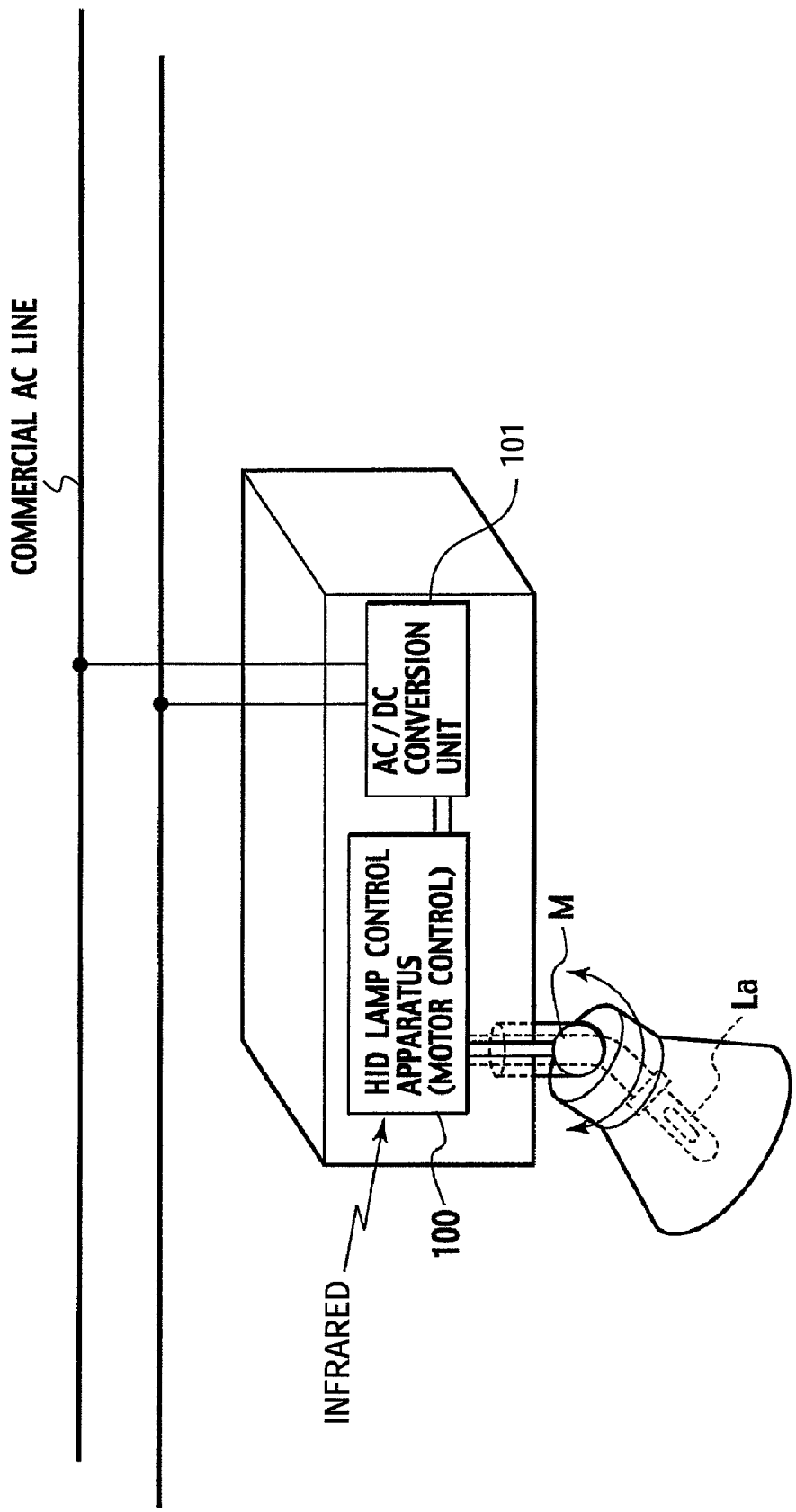
FIG. 6 is an entire configuration diagram of a second embodiment of the present invention.

As shown in FIG. 6, in this second embodiment, an HID lamp control apparatus 100 is provided, in which a lighting control for an HID lamp La (high intensity discharge lamp) and a control for a motor are integrated with each other. This HID lamp control apparatus 100 has similar functions to those of the headlamp control apparatus 1. The HID lamp control apparatus 100 controls lighting of the HID lamp La for general use (for a shop and stage illumination), and performs a control for driving a motor M for a light distribution operation of the HID lamp La concerned. As shown by arrows in this diagram, this motor M rotationally drives an attachment portion of the HID lamp La, and moves an irradiation direction thereof. Note that a usage purpose of the HID lamp La is not limited to the vehicle shown in the first embodiment, or to the shop or the stage illumination. Specifically, the HID lamp control apparatus 100 in the second embodiment can be applied to every usage purpose as long as the HID lamp control apparatus 100 can simultaneously perform the lighting control for the HID lamp La and the drive control for the motor M.

This HID lamp control apparatus 100 and an AC/DC conversion unit 101 are housed in the same cabinet. The AC/DC conversion unit 101 is connected to a commercial AC line, and supplies a direct current voltage to the HID lamp control apparatus 100. The HID lamp La is connected to the HID lamp control apparatus 100, and is exposed from the cabinet. By being supplied with the direct current voltage converted in the AC/DC conversion unit 101, the HID lamp control apparatus 100 performs the lighting control for the HID lamp La.

Figure 7:
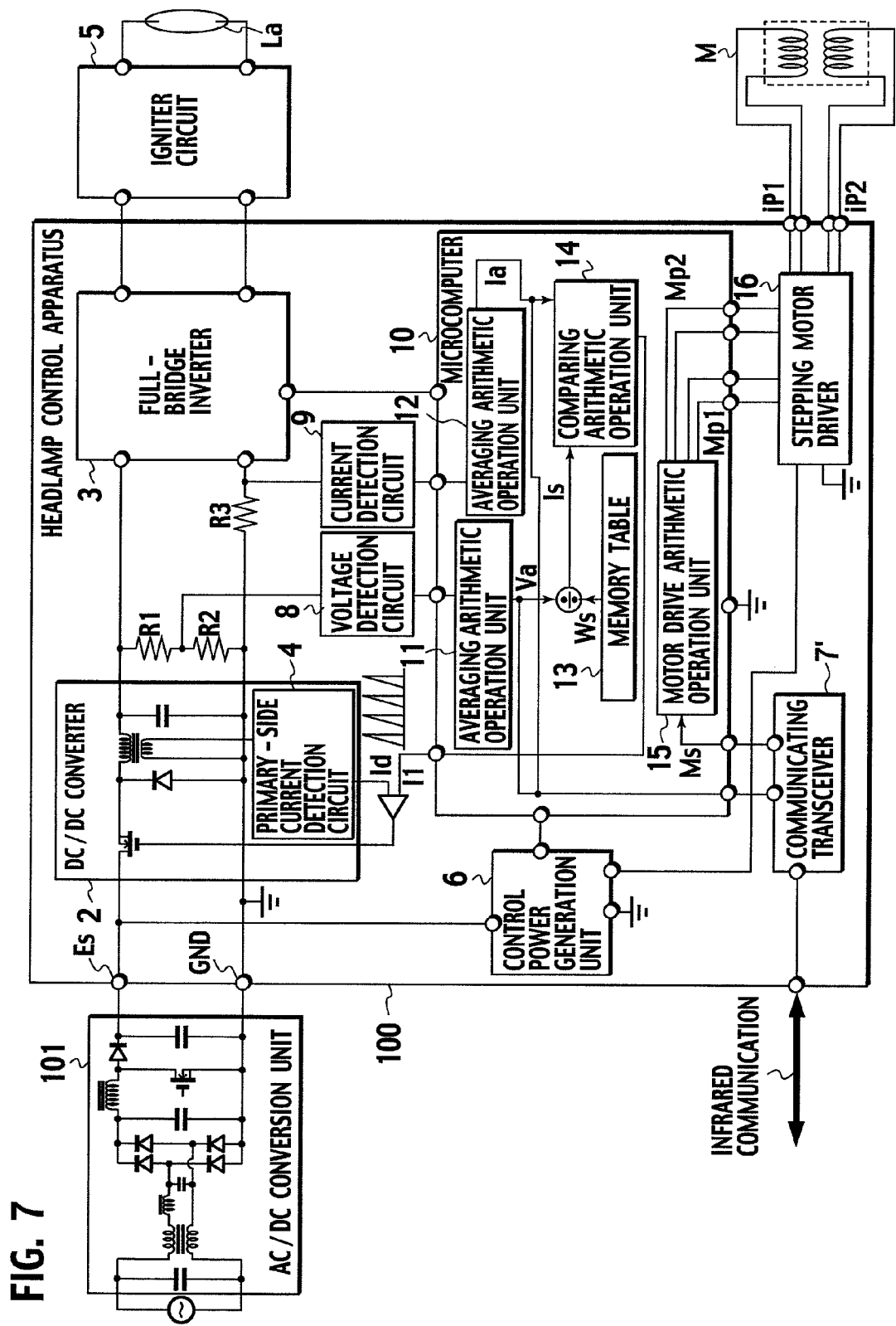
FIG. 7 is a circuit block diagram of a headlamp control apparatus for use in the second embodiment of the present invention.
Figure 8:
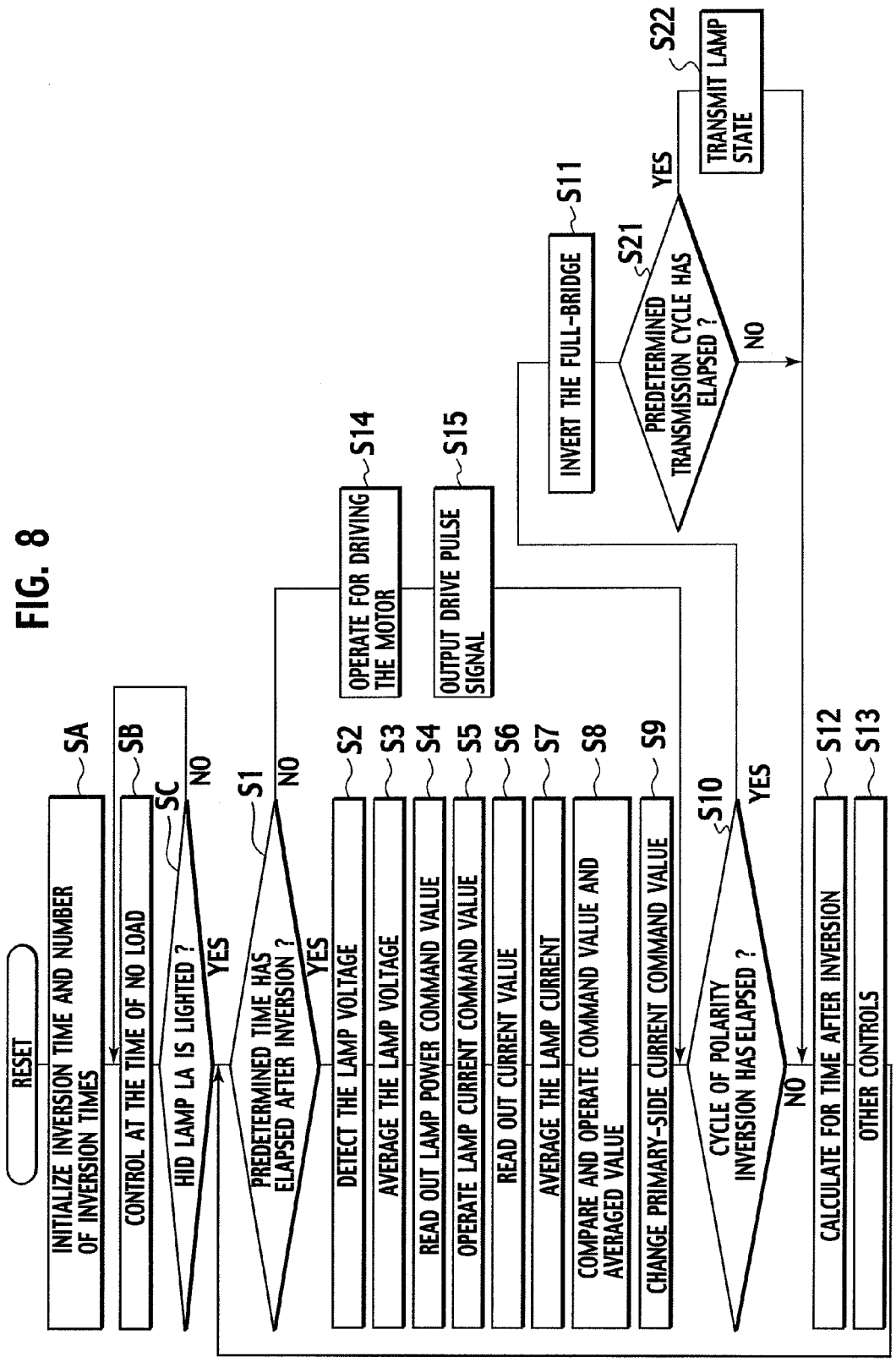
FIG. 8 is a flowchart showing microcomputer operations of the second embodiment of the present invention.

Moreover, the HID lamp control apparatus 100 receives target position information of the motor M by a UART, infrared communication and the like. This communication processing is performed by a communicating transceiver 7' as shown in FIG. 7. In response to the reception of this target position information of the motor M by the communicating transceiver 7', the HID lamp control apparatus 100 outputs a drive current to the motor M for moving a light distribution of the HID lamp La. At the same time, the HID lamp control apparatus 100 outputs, through the communicating transceiver 7', such a lamp state that is represented as an averaged voltage value Va averaged by an averaging arithmetic operation unit 11 and an averaged lamp current Ia averaged by an averaging arithmetic operation unit 12.

As shown in FIG. 7, by a DC-DC converter 2, the HID lamp control apparatus 100 obtains the direct current voltage converted by the AC/DC conversion unit 101. Unlike the above-mentioned DC-DC converter 2, the DC-DC converter 2 is composed of a step-down chopper circuit. The direct current voltage dropped by this step-down chopper circuit is supplied to a full-bridge inverter 3, and is used for lighting the HID lamp La.

In a similar way to FIG. 3 mentioned above, a microcomputer 10 of the HID lamp control apparatus 100 composed as described above performs Step SA to Step SC, and performs Step S1 to Step S11 or performs Step S1 and Steps S14, S15, S10 and S11, and thereafter advances the processing to Step S21. Specifically, in the case where the microcomputer 10 determines in Step S10 that a cycle while the lamp voltage and the lamp current are inverted in the full-bridge inverter 3 has elapsed, and detects in Step S11 that the lamp voltage and lamp current of the full-bridge inverter 3 have been inverted in a fixed cycle as shown in FIG. 5, the microcomputer 10 advances the processing to Step S21.

In Step S21, the microcomputer 10 determines whether or not a predetermined transmission cycle has elapsed. At this time, the microcomputer 10 counts the number of inversion times after the lamp voltage and the lamp current in the full-bridge inverter 3 were inverted in the fixed cycle, and thereby determines whether or not the predetermined transmission cycle has elapsed. The microcomputer 10 advances the processing to Step S22 only in the case of having determined that the predetermined transmission cycle has elapsed.

In Step S22, the microcomputer 10 outputs, as the lamp state, the averaged voltage value Va obtained by the averaging arithmetic operation unit 11 and the averaged lamp current Ia obtained by the averaging arithmetic operation unit 12 to the communicating transceiver 7'. In such a way, the microcomputer 10 allows the communicating transceiver 7' to transmit the lamp state.

Figure 9:
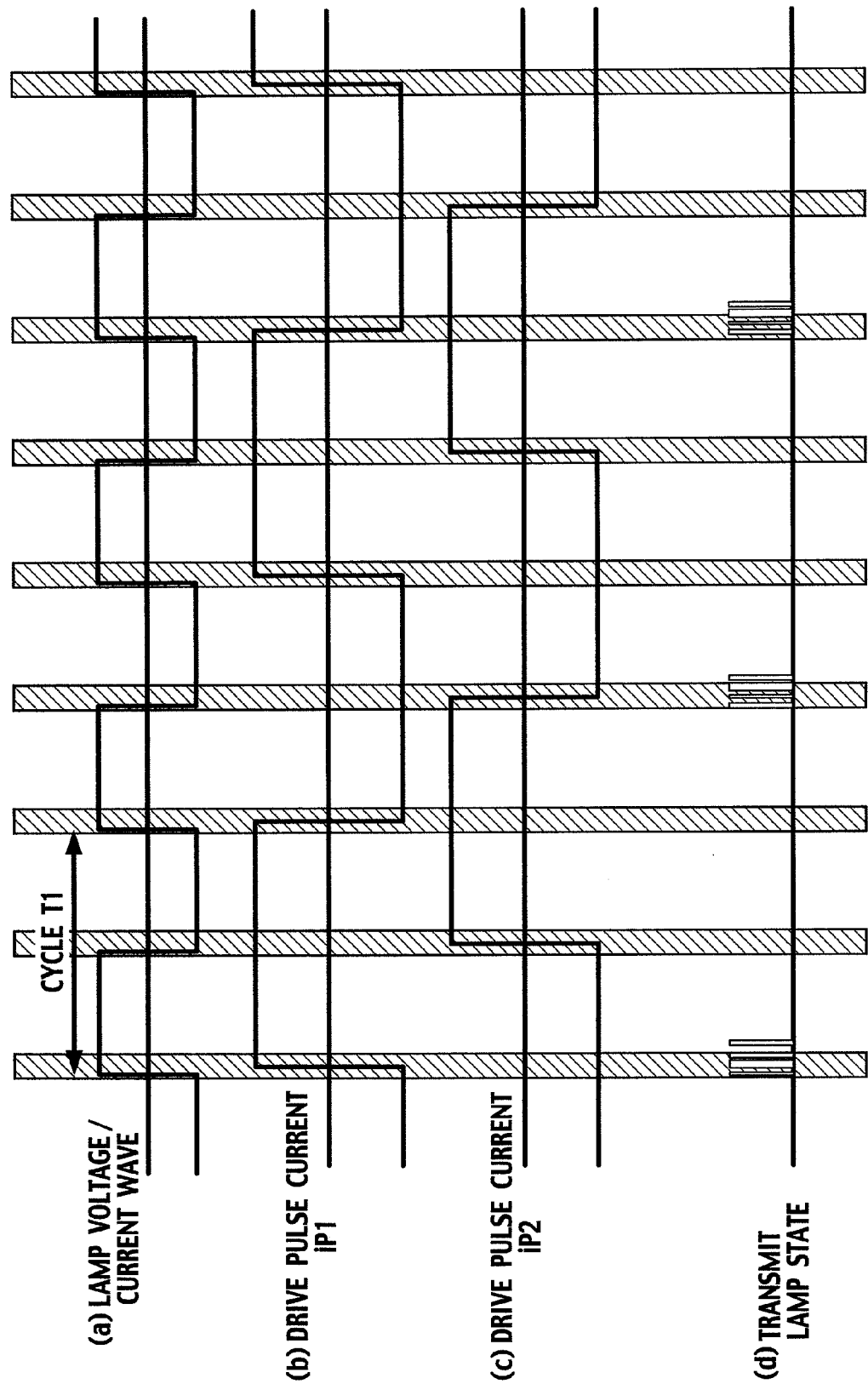
FIG. 9 is a waveform chart for explaining operations of the second embodiment of the present invention.

From the above, as shown in FIG. 9D, the transmission processing for the lamp state can be synchronized with the inversions of the lamp voltage and the lamp current in the full-bridge inverter 3 in FIG. 9A. Specifically, the lamp state can be transmitted from the communicating transceiver 7' in synchronization with inversion timing of the lamp current and the lamp voltage, which is shown in hatched portions of FIG. 9. Note that drive pulse currents iP1 and iP2 in FIGS. 9B and 9C are similar to the drive pulse currents iP1 and iP2 of the motor M, which are shown in FIGS. 4D and 4E. Hence, the microcomputer 10 can synchronize the inversion timing of the lamp voltage and the lamp current, the drive timing of the motor M and the transmission timing of the lamp state with one another.

Note that, in this embodiment, the case is shown, where the transmission processing for the lamp state is performed every time when the inversions of the lamp voltage and the lamp current in the full-bridge inverter 3 occur three times. For example, since a frequency of such polarity inversions of the lamp voltage and the lamp current in the full-bridge inverter 3 is 300 Hz, an inversion cycle of the lamp voltage and the lamp current becomes 1.66 msec. Accordingly, the transmission cycle of the lamp state becomes approximately 5 msec. Note that it also becomes possible to set the transmission cycle at a time period of integral multiple times a half of the inversion cycle of the full-bridge inverter 3.

In accordance with the HID lamp control apparatus 100 as described above, in a similar way to the first embodiment, such processing loads on the constant power control for the HID lamp La and the control for the motor can be temporally divided, whereby both of the controls can be made compatible with each other by one microcomputer. In addition to this, in accordance with the HID lamp control apparatus 100, the processing for transmitting the lamp information can also be realized by the one microcomputer 10.

In general, when the processing load on the constant power control for the HID lamp La and the processing load on the control for the motor are compared with each other, the load on the constant power control for the HID lamp La is relatively larger. Hence, in accordance with the HID lamp control apparatus 100, the transmission processing for the lamp information is performed at the time when the lamp voltage and the lamp current in the full-bridge inverter 3 are inverted, whereby the processing load on the microcomputer 10 can be temporally divided effectively.

Note that, in the second embodiment, the microcomputer 10 is shown, which simultaneously performs the control for the motor M for controlling the light distribution of the HID lamp La, the constant power control for the HID lamp La itself and the transmission control for the lamp information. However, the microcomputer 10 may be one that performs two controls, which are the constant power control for the HID lamp La and the drive control for the motor M. Moreover, the microcomputer 10 may be one that performs two controls, which are the constant power control for the HID lamp La and the transmission control for the lamp state.

Moreover, as the lamp information transmitted from the HID lamp control apparatus 100, there are mentioned the averaged voltage value Va and the averaged lamp current Ia; however, the lamp information may be any other information regarding the HID lamp La. For example, in the HID lamp control apparatus 100, a detection circuit is provided, which detects information telling that the HID lamp La is not lighted owing to abnormality and the like of the HID lamp La, information on a total lighting time of the HID lamp La and the number of ON/OFF times of the HID lamp La, information on a failure location at the time when a failure occurs in the HID lamp La, and the like. Then, the variety of information on the HID lamp La concerned is stored in the microcomputer 10 in advance, and such lamp information is transmitted in synchronization with the constant power control for the HID lamp La and the drive control for the motor M. In such a way, the lamp information is received at the outside of the HID lamp control apparatus 100, whereby maintenance such as repairing and lifetime diagnosis of the HID lamp La can be supported.

Third Embodiment

Next, a description is made of a third embodiment to which the present invention is applied. Note that the same reference numerals and the same step numbers are assigned to the same portions as those of the above-mentioned embodiments of the invention, whereby a detailed description thereof is omitted.

Figure 10:
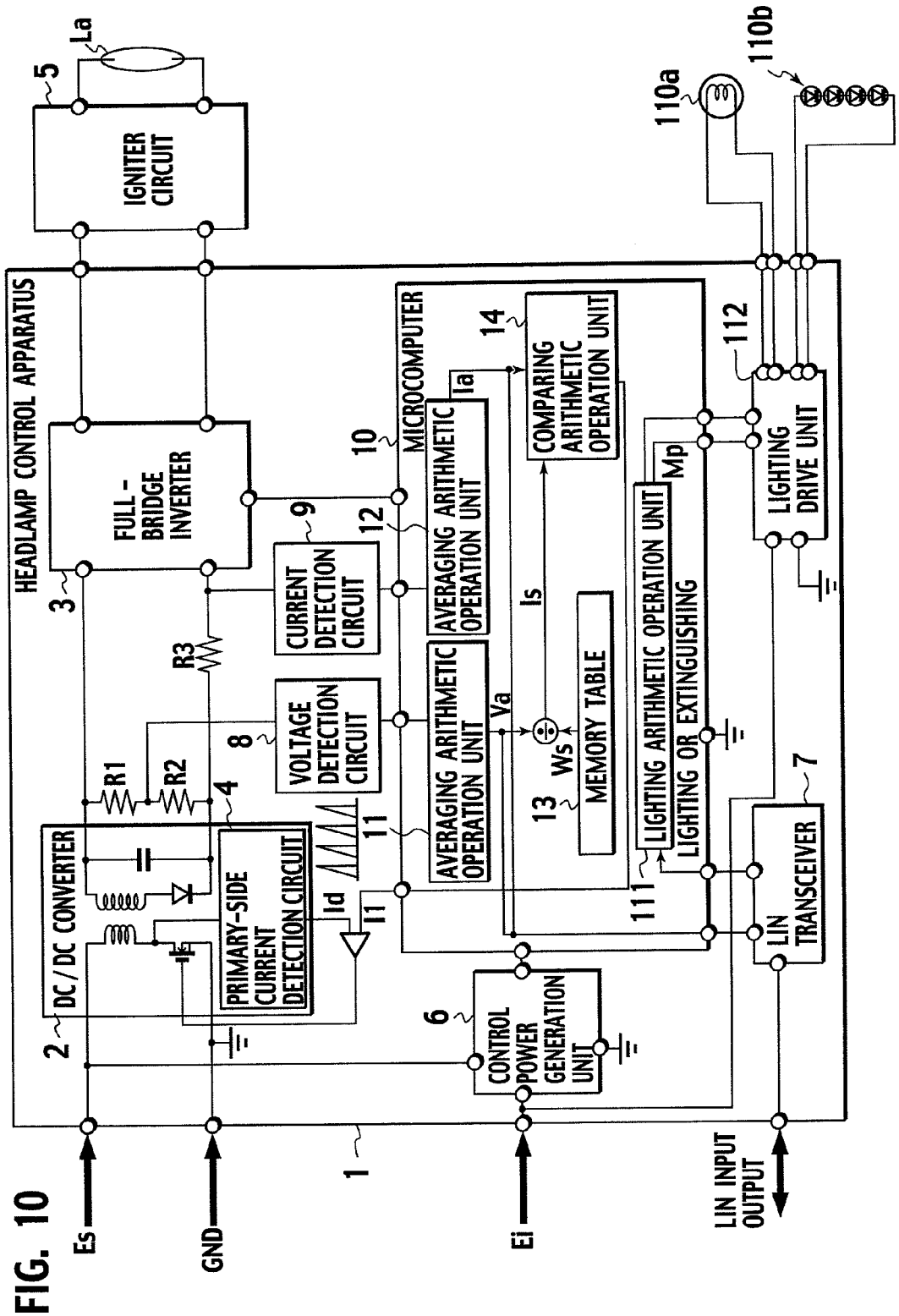
FIG. 10 is a circuit block diagram of a headlamp control apparatus for use in a third embodiment of the present invention.

As shown in FIG. 10, a curve lamp 110a and a side lamp 110b are connected as other lamps than the HID lamp La to a headlamp control apparatus 1 according to the third embodiment. This headlamp control apparatus 1 simultaneously controls the HID lamp la, the curve lamp 110a and the side lamp 110b.

The headlamp control apparatus 1 receives signals for lighting or extinguishing the curve lamp 110a and the side lamp 110b through a LIN communication line by the LIN transceiver 7. In the case of having received the signals for lighting or extinguishing the curve lamp 110a and the side lamp 110b, the LIN transceiver 7 outputs the signals concerned to a lighting arithmetic operation unit 111 of a microcomputer 10.

In response to the reception of the signals for lighting or extinguishing the curve lamp 110a and the side lamp 110b from the LIN transceiver 7, the lighting arithmetic operation unit 111 outputs such drive signals for lighting or extinguishing the curve lamp 110a and the side lamp 110b to a lighting drive unit 112. In response to the drive signals supplied from the lighting arithmetic operation unit 111 of the microcomputer 10, the lighting drive unit 112 individually supplies drive currents to the curve lamp 110a and the side lamp 110b.

Moreover, in a similar way to the HID lamp control apparatus 100 in the above-mentioned second embodiment, this headlamp control apparatus 1 outputs an averaged voltage value Va, which is arithmetically operated by an averaging arithmetic operation unit 11, and an averaged lamp current Ia, which is arithmetically operated by an averaging arithmetic operation unit 12, to the LIN communication line by the LIN transceiver 7.

Figure 11:
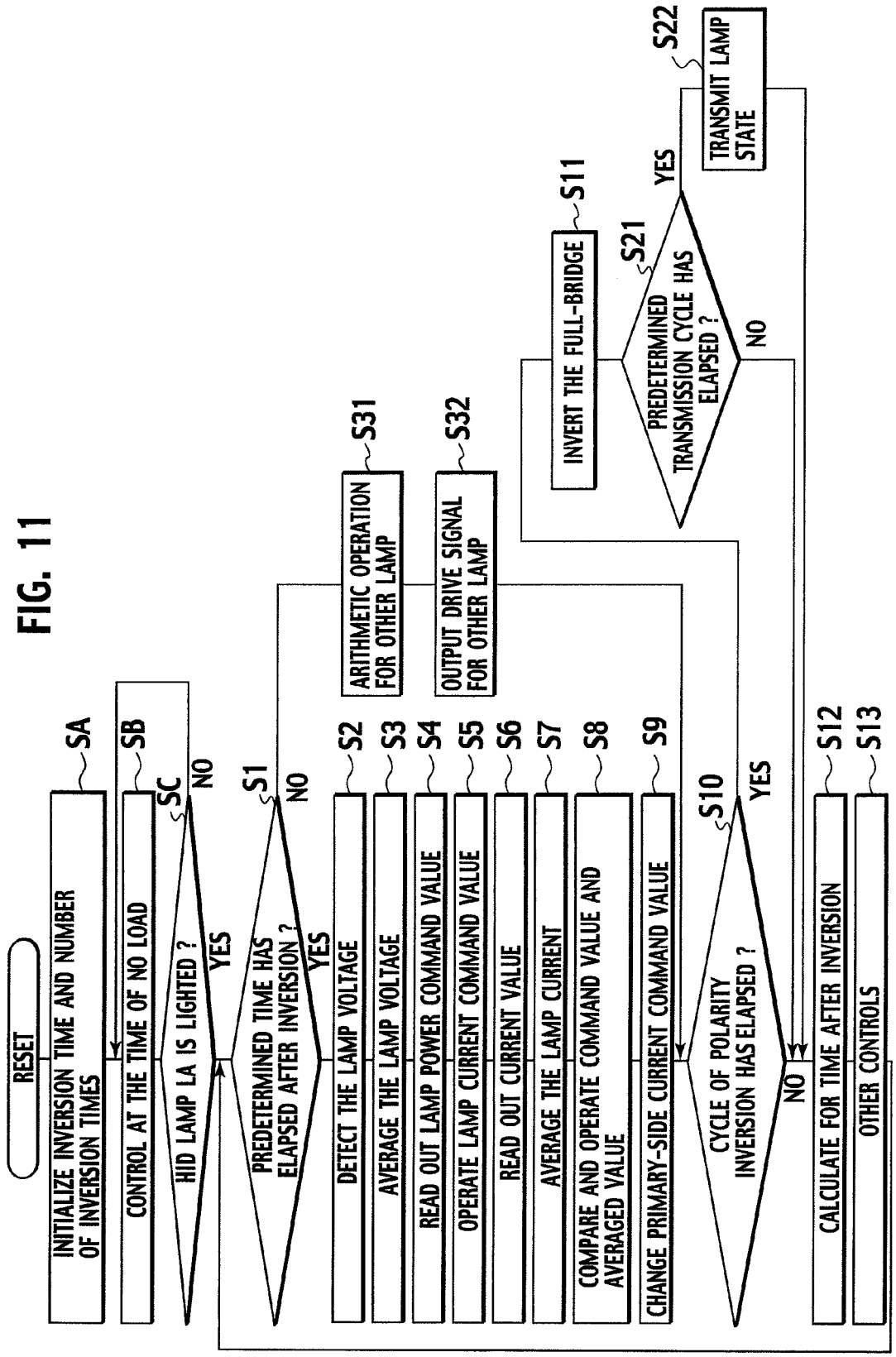
FIG. 11 is a flowchart showing microcomputer operations of the third embodiment of the present invention.

With reference to FIG. 11, a description is made of operations of the headlamp control apparatus 1 as described above. In a similar way to the HID lamp control apparatus 100 in the second embodiment, after Step S1, this headlamp control apparatus 1 performs the processing of Step S21 and Step S22, and performs the transmission processing for the lamp state in synchronization with the constant power control for the HID lamp La.

Moreover, in the case of having determined in Step S1 that the predetermined time has not elapsed after the inversions of the lamp voltage and the lamp current in a full-bridge inverter 3, the headlamp control apparatus 1 performs processing of Step S31 and Step S32 in place of the processing of Step S14 and Step S15, which are mentioned above.

In Step S31, the headlamp control apparatus 1 performs an arithmetic operation for lighting the curve lamp 110a and the side lamp 110b, which are other than the HID lamp La. Then, in the case of driving the curve lamp 110a and the side lamp 110b, the headlamp control apparatus 1 outputs the drive signals thereof. In this arithmetic operation, from the LIN transceiver 7, the lighting arithmetic operation unit 111 performs processing for determining whether or not to light the curve lamp 110a and the side lamp 110b, and determines whether or not the curve lamp 110a and the side lamp 110b are lighted. For example, the lighting arithmetic operation unit 111 determines that the curve lamp 110a is lighted only when the HID lamp La is lighted.

In the next Step S32, the headlamp control apparatus 1 outputs the drive signals obtained by the arithmetic operation in Step S31 to the lighting drive unit 112.

Figure 12:
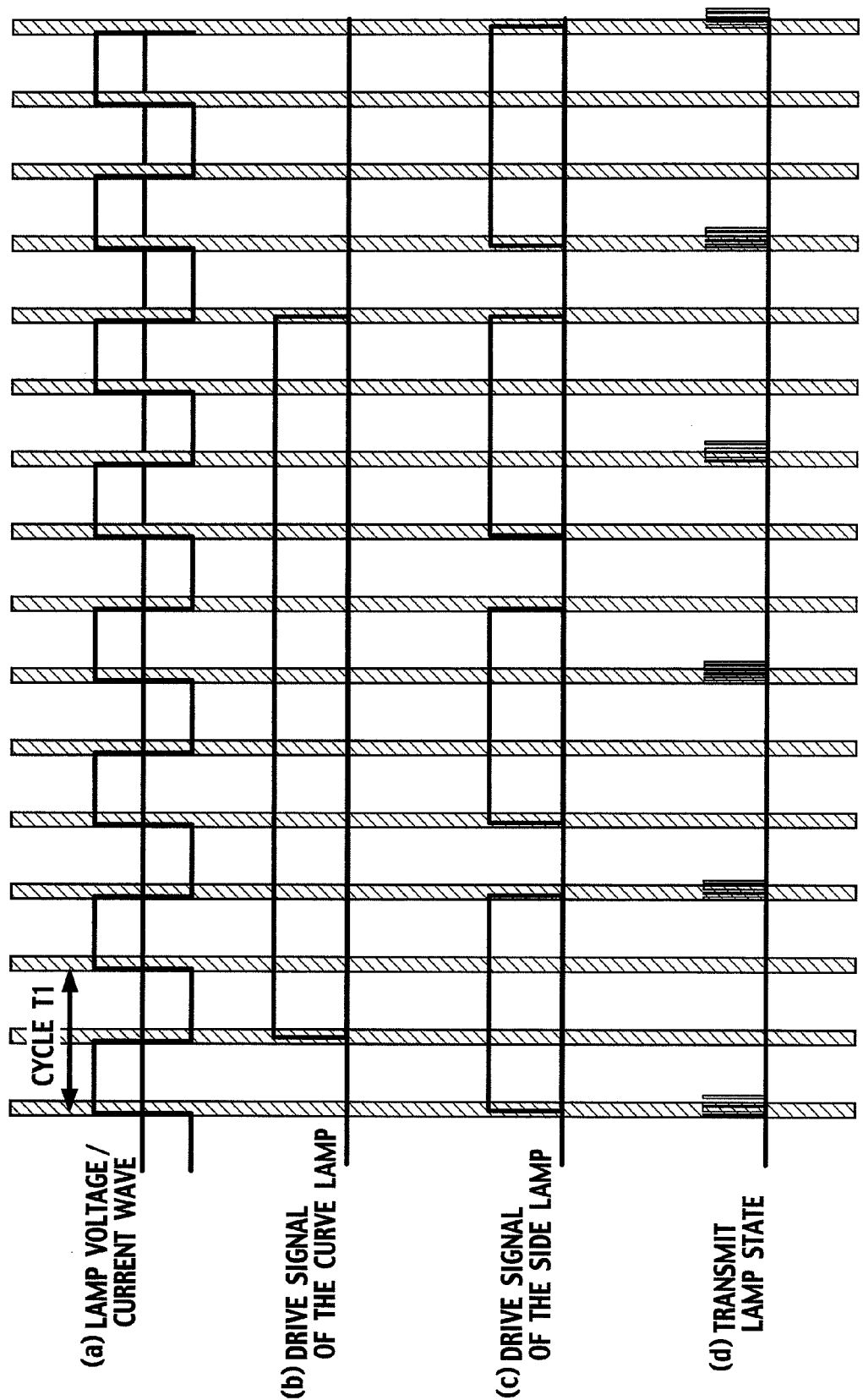
FIG. 12 is a waveform chart for explaining operations of the third embodiment of the present invention.

In accordance with the headlamp control apparatus 1 as described above, inversion timing of the lamp voltage and the lamp current in the full-bridge inverter 3, which is shown in FIG. 12A, the drive signal of the curve lamp 110a, which is shown in FIG. 12B, the drive signal of the side lamp 110b, which is shown in FIG. 12C, and the transmission processing for the lamp state, which is shown in FIG. 12D, can be synchronized with one another.

In such a way, the constant power control for the HID lamp La, the control for the other lamps such as the curve lamp 110a and the side lamp 110b, and the communication control, all of which are required as functions of the microcomputer 10, can be temporally divided. Hence, these controls can be performed by the one microcomputer 10, and such a plurality of the controls can be realized without advancing the microcomputer 10 in terms of functions. In addition to this, in accordance with the headlamp control apparatus 1, the processing for transmitting the lamp information can also be realized by the one microcomputer 10.

In general, when a processing load on the constant power control for the HID lamp La and a processing load on the control for the other lamps are compared with each other, the load on the constant power control for the HID lamp La is relatively larger. Hence, in accordance with the headlamp control apparatus 1, the transmission processing for the lamp information is performed at the time when the lamp voltage and the lamp current in the full-bridge inverter 3 are inverted, whereby the processing load on the microcomputer 10 can be temporally divided effectively.

Note that, in the third embodiment, the microcomputer 10 is shown, which simultaneously performs the control for the other lamps, the constant power control for the HID lamp La itself and the transmission control for the lamp information. However, the microcomputer 10 may be one that performs two controls, which are the constant power control for the HID lamp La and the drive control for the other lamps. Moreover, the microcomputer 10 may be one that performs two controls, which are the constant power control for the HID lamp La and the transmission control for the lamp state.

Moreover, as the lamp information transmitted from the HID lamp control apparatus 100, there are mentioned the averaged voltage value Va and the averaged lamp current Ia; however, the lamp information may be any other information regarding the HID lamp La. For example, in the HID lamp control apparatus 100, a detection circuit is provided, which detects information telling that the HID lamp La is not lighted owing to abnormality and the like of the HID lamp La, information on a total lighting time of the HID lamp La and the number of ON/OFF times of the HID lamp La, information on a failure location at the time when a failure occurs in the HID lamp La, and the like. Then, the variety of information on the HID lamp La concerned is stored in the microcomputer 10 in advance, and such lamp information is transmitted in synchronization with the constant power control for the HID lamp La and the drive control for the motor M. In such a way, the lamp information is received at the outside of the HID lamp control apparatus 100, whereby maintenance such as repairing and lifetime diagnosis of the HID lamp La can be supported.

Furthermore, the curve lamp 110a and the side lamp 110b are mentioned as examples of the other lamps; however, even if the other lamps are a direction indicator lamp for indicating a direction of the vehicle, a daylight and a high beam light (high/low switching solenoid), these other lamps can be controlled in synchronization with the control for the HID lamp La as described above.

Still further, in general, inversion frequencies of the lamp voltage and the lamp current in the full-bridge inverter 3 are several hundred hertz, and accordingly, when ON/OFF of such a lamp is repeated at this frequency, human eyes cannot grasp that the lamp blinks. From the above, in the control for lighting the side lamp 110b, for example, a period obtained by multiplying, by three, a half cycle of each inversion of the lamp voltage and the lamp current in the full-bridge inverter 3 is set as a lighting period, and a period obtained by multiplying the half cycle by one is set as an extinguishing period, whereby the side lamp 110b can be subjected to a dimmer control (inverter control) at a duty ratio of 75%. By performing a similar control, it becomes possible to realize a dimmer control for the other lamps.

Moreover, it is needless to say that it is possible to allow a person to recognize blinking of the HID lamp La by slowing down a blinking cycle thereof in such a manner that the lighting period and extinguishing period of the HID lamp La are extended. For example, a control for the ON/OFF cycle of the direction indicator lamp and a blinking control for allowing the daytime lighting daylight to be conspicuous can be synchronized with each other.

Fourth Embodiment

Next, a description is made of a fourth embodiment to which the present invention is applied. Note that the same reference numerals and the same step numbers are assigned to the same portions as those of the above-mentioned embodiments of the invention, whereby a detailed description thereof is omitted.

Figure 13:
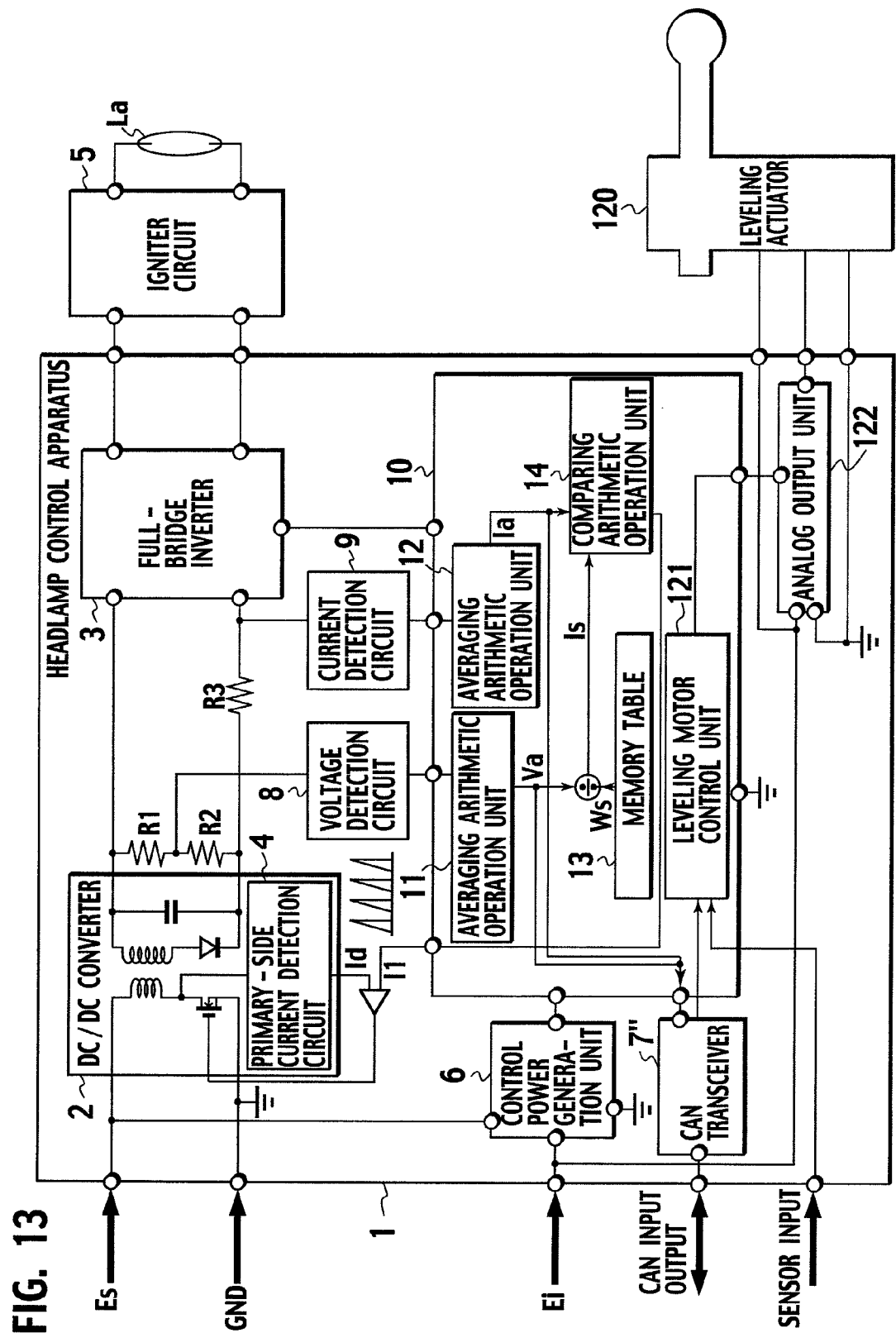
FIG. 13 is a circuit block diagram of a headlamp control apparatus for use in a fourth embodiment of the present invention.

As shown in FIG. 13, besides the HID lamp La, a leveling actuator 120 that drives an optical axis of the HID lamp La in an up-and-down direction is connected as a control-subject load to a headlamp control apparatus 1 according to the fourth embodiment. This headlamp control apparatus 1 simultaneously controls an operation of the HID lamp La and an operation of the leveling actuator 120.

The headlamp control apparatus 1 receives the vehicle information such as the vehicle speed through a CAN communication line by a CAN transceiver 7", and outputs an averaged voltage value Va and an averaged lamp current value Ia. Upon receiving the vehicle information concerned, the CAN transceiver 7" outputs the vehicle information concerned to a leveling motor control unit 121 of a microcomputer 10. This vehicle information is one of the information for arithmetically operating a target for which the leveling actuator 120 is to be driven. Specifically, while the target position information of the motor M is obtained in the above-described control for the motor M, the headlamp control apparatus 1 of the fourth embodiment obtains the vehicle information in place of the target position information.

Moreover, the headlamp control apparatus 1 is connected to a vehicle height sensor (not shown). The headlamp control apparatus 1 performs A/D conversion for a vehicle height sensor signal, and outputs the vehicle height sensor signal to the leveling motor control unit 121 of the microcomputer 10.

Based on the vehicle height sensor signal, the leveling motor control unit 121 arithmetically operates an inclination of the vehicle in a fore-and-aft direction. Moreover, the leveling motor control unit 121 receives vehicle information indicating the vehicle speed from the CAN transceiver 7", and arithmetically operates whether the vehicle is being stopped or is stably running. In such a way, the leveling motor control unit 121 determines whether or not to control a light distribution by driving the leveling actuator 120. In the case where it is necessary to drive the leveling actuator 120, the leveling motor control unit 121 outputs a drive signal with a value corresponding to the fore-and-aft inclination of the vehicle to an analog output unit 122. This drive signal is a PWM (pulse width modulation) signal of 0 volt and 5 volt since the drive signal is outputted from the microcomputer 10.

The analog output unit 122 charges and discharges power, which is supplied from an ignition power supply Ei, to and from a smoothing capacitor (not shown) in response to the drive signal outputted from the leveling motor control unit 121, whereby an analog signal indicating the target position is outputted to the leveling actuator 120.

The leveling actuator 120 compares the analog signal indicating the target position, which is supplied from the analog output unit 122, and an analog value (a value obtained by detecting a moving distance of a motor by using a variable resistor or the like) that corresponds to a leveling angle with each other, and controls the motor so that both of the values can coincide with each other, and thereby controls an up-and-down light distribution of the HID lamp La.

Figure 14:
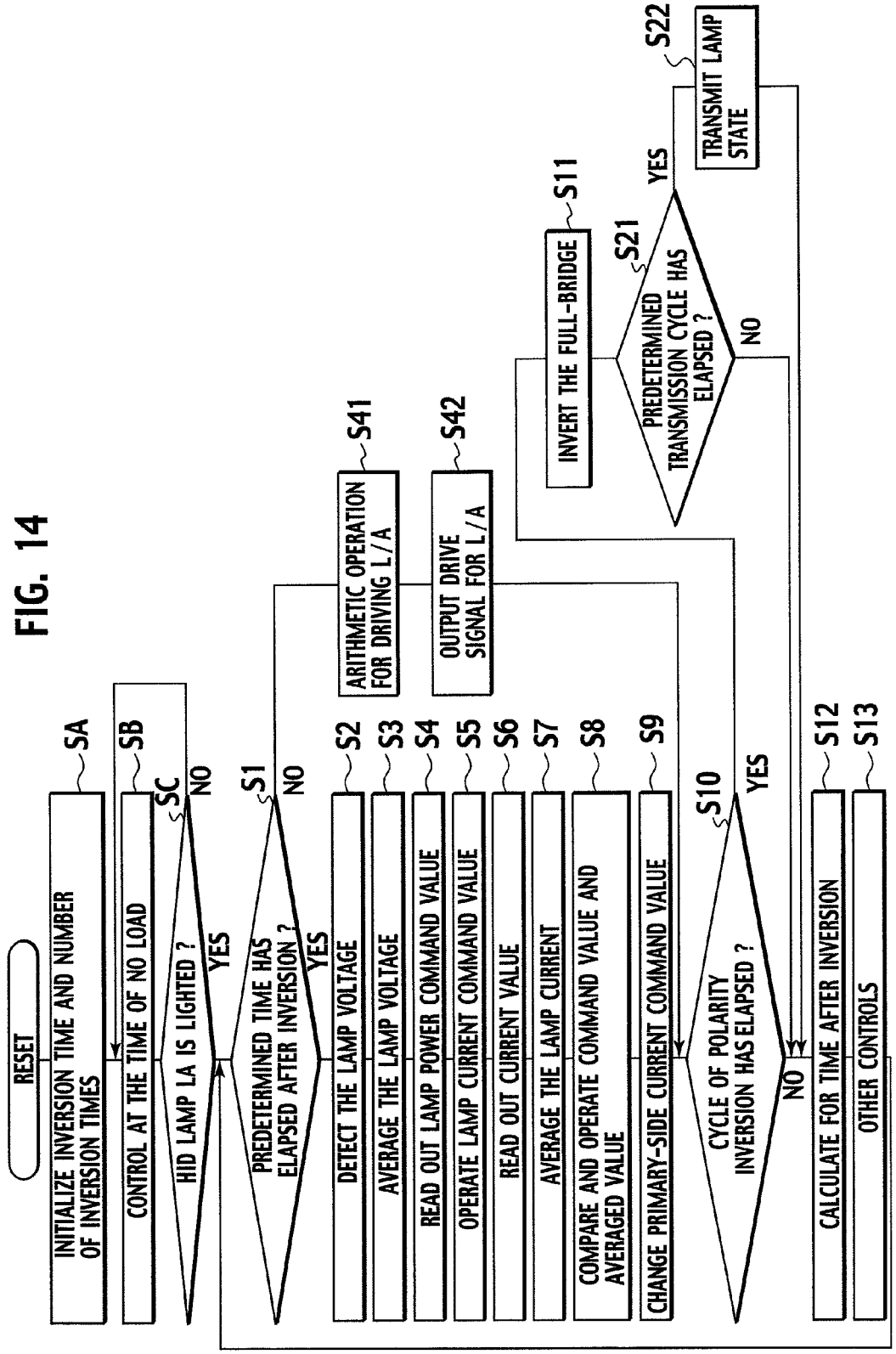
FIG. 14 is a flowchart showing microcomputer operations of the fourth embodiment of the present invention.

With reference to FIG. 14, a description is made of operations of the headlamp control apparatus 1 as described above. In a similar way to the HID lamp control apparatus 100 in the second embodiment, after Step S1, this headlamp control apparatus 1 performs the processing of Step S21 and Step S22, and performs the transmission processing for the lamp state through the CAN transceiver 7" in synchronization with the constant power control for the HID lamp La.

Moreover, in the case of having determined in Step S1 that the predetermined time has not elapsed after the inversions of the lamp voltage and the lamp current in a full-bridge inverter 3, the headlamp control apparatus 1 performs processing of Step S41 and Step S42.

In Step S41, the leveling motor control unit 121 performs the arithmetic operation for driving a leveling motor (L/A). At this time, the leveling motor control unit 121 reads such a vehicle height sensor value subjected to the A/D conversion, arithmetically operates the inclination of the vehicle based on the vehicle height sensor value concerned, and determines whether or not the inclination of the vehicle is stable. At this time, based on the vehicle speed information supplied from the CAN transceiver 7", the leveling motor control unit 121 determines whether or not the vehicle is being stopped or is stably running at a constant speed. In the case where the vehicle is being stopped or is stably running at the constant speed, and the vehicle height sensor value is also stable, the leveling motor control unit 121 arithmetically operates a drive signal with the signal value corresponding to the inclination of the vehicle.

In Step S42, the analog output unit 122 receives the drive signal arithmetically operated in Step S41, and drives the leveling actuator 120.

Figure 15:
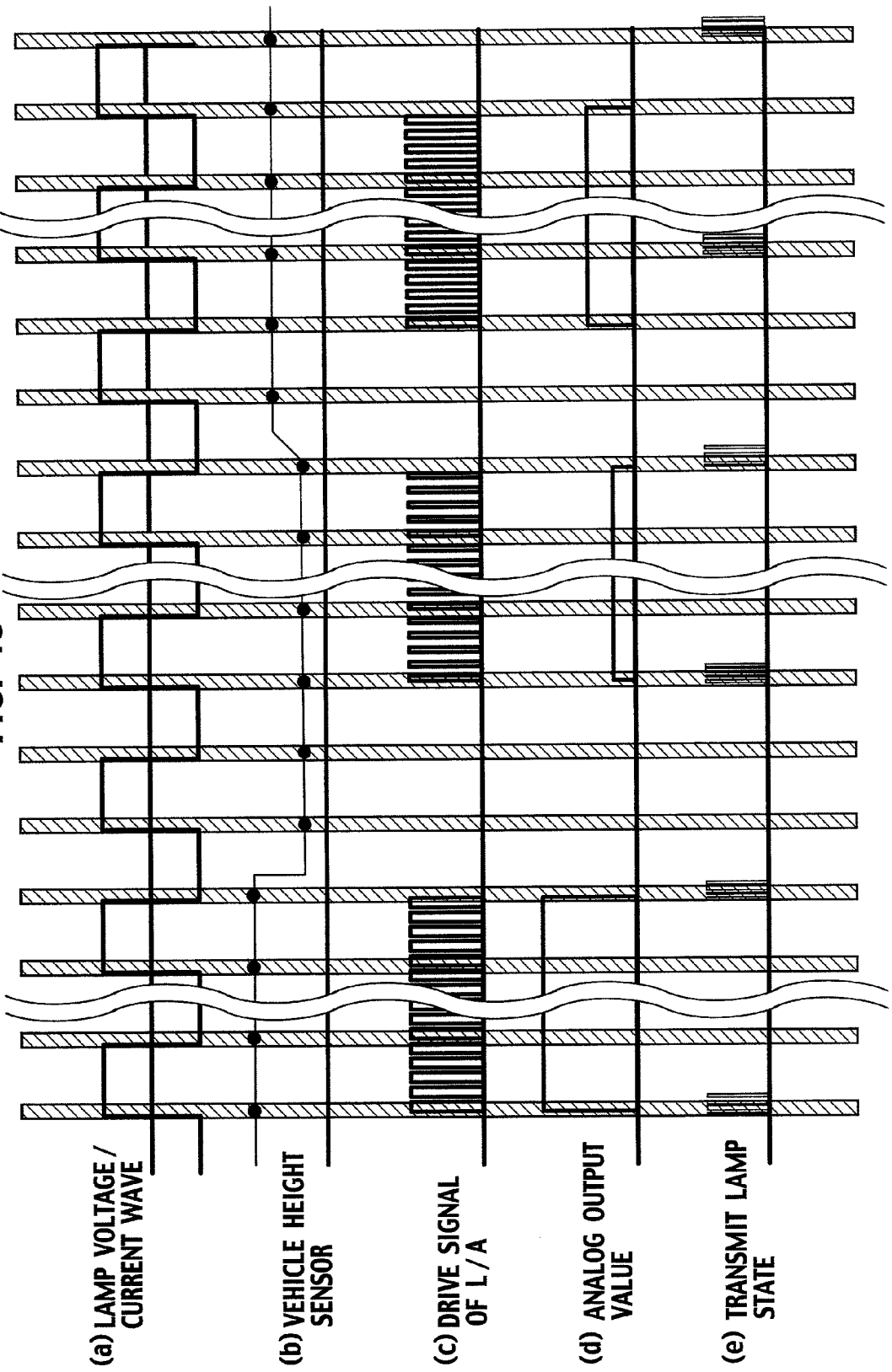
FIG. 15 is a waveform chart for explaining operations of the fourth embodiment of the present invention.

In accordance with the headlamp control apparatus 1 as described above, inversion timing of the lamp voltage and the lamp current in the full-bridge inverter 3, which is shown in FIG. 15A, reading timing of the vehicle height sensor value shown by a circle mark of FIG. 15B and the arithmetic operation processing for driving the leveling actuator 120, the drive signal of the leveling motor control unit 121, which is shown in FIG. 15C, the analog output value from the analog output unit 122, which is shown in FIG. 15D, and the transmission processing for the lamp state, which is shown in FIG. 15E, can be synchronized with one another.

In such a way, the constant power control for the HID lamp La, the control for the leveling actuator 120, and the communication control, all of which are required as the functions of the microcomputer 10, can be temporally divided. Hence, these controls can be performed by the one microcomputer 10, and the plurality of controls can be realized without advancing the microcomputer 10 in terms of functions. In addition to this, in accordance with the headlamp control apparatus 1, the processing for transmitting the lamp information can also be realized by the one microcomputer 10.

Moreover, in general, the microcomputer 10 has, as a timer function, a function to output the PWM signal, and once an output setting thereof is made, automatically outputs the PWM signal until the output of the PWM signal is instructed to be stopped. Accordingly, the microcomputer 10 is free from a processing load for outputting the drive signal. Therefore, the microcomputer 10 sets the timer at the time when the lamp voltage and the lamp current in the full-bridge inverter 3 are inverted, and thereby can realize the temporal division of the processing.

Furthermore, in accordance with the headlamp control apparatus 1, a duty ratio of the PWM signal is changed in response to the vehicle height sensor, whereby the analog output value outputted from the analog output unit 122 is changed, and the leveling actuator 120 performs the light distribution control in the up-and-down direction in response to the analog output value. Accordingly, it is understood that the control for the leveling actuator 120 can be realized.

Still further, in accordance with this headlamp control apparatus 1, in a similar way to the above-mentioned embodiments, the transmission processing for the lamp state can be performed by the one microcomputer 10 in synchronization with the control for the HID lamp La.

In general, when the processing load on the constant power control for the HID lamp La and the processing load on the control for the leveling actuator 120 are compared with each other, the load on the constant power control for the HID lamp La is relatively larger. Hence, in accordance with the headlamp control apparatus 1, the control for the leveling actuator 120 is performed at the time when the lamp voltage and the lamp current in the full-bridge inverter 3 are inverted, whereby the processing load on the microcomputer 10 can be temporally divided effectively.

Note that, in the fourth embodiment, the microcomputer 10 is shown, which simultaneously performs the control for the leveling actuator 120, the constant power control for the HID lamp La itself and the transmission control for the lamp information. However, the microcomputer 10 may be one that performs two controls, which are the constant power control for the HID lamp La and the drive control for the leveling actuator 120. Moreover, the microcomputer 10 may be one that performs two controls, which are the constant power control for the HID lamp La and the transmission control for the lamp state. Furthermore, the vehicle height sensor value is read in the fourth embodiment; however, the processing load on the microcomputer 10 can be reduced even if A/D conversion for reading a position of the leveling actuator 120 is performed simultaneously.

Moreover, in the fourth embodiment, the inclination of the vehicle in the fore-and-aft direction is arithmetically operated by the vehicle height sensor value; however, the vehicle height sensors may be individually provided in a front and rear portions of the vehicle, and vehicle height sensor values read therefrom may be arithmetically operated.

Furthermore, in the fourth embodiment, the vehicle height sensor value as the analog value is inputted to the headlamp control apparatus 1; however, the vehicle height sensor value may be converted into a CAN signal by the vehicle height sensor or a dedicated ECU, and a value of the vehicle height or the fore-and-aft inclination of the vehicle may be inputted as the CAN signal to the headlamp control apparatus 1.

Fifth Embodiment

Next, a description is made of a fifth embodiment to which the present invention is applied. Note that the same reference numerals and the same step numbers are assigned to the same portions as those of the above-mentioned embodiments of the invention, whereby a detailed description thereof is omitted. Note that the fifth embodiment is described with reference to the configuration shown in the first embodiment.

In the above-mentioned embodiments, for example as shown in FIG. 3, in the case where the predetermined time has not elapsed since the polarities of the lamp voltage and the lamp current (square waves) for lighting the HID lamp La were inverted, the arithmetic operation for driving the motor M is performed in Step S14 every time when the polarities are inverted (Step S14), and the drive pulse is changed in Step S15.

Figure 16:
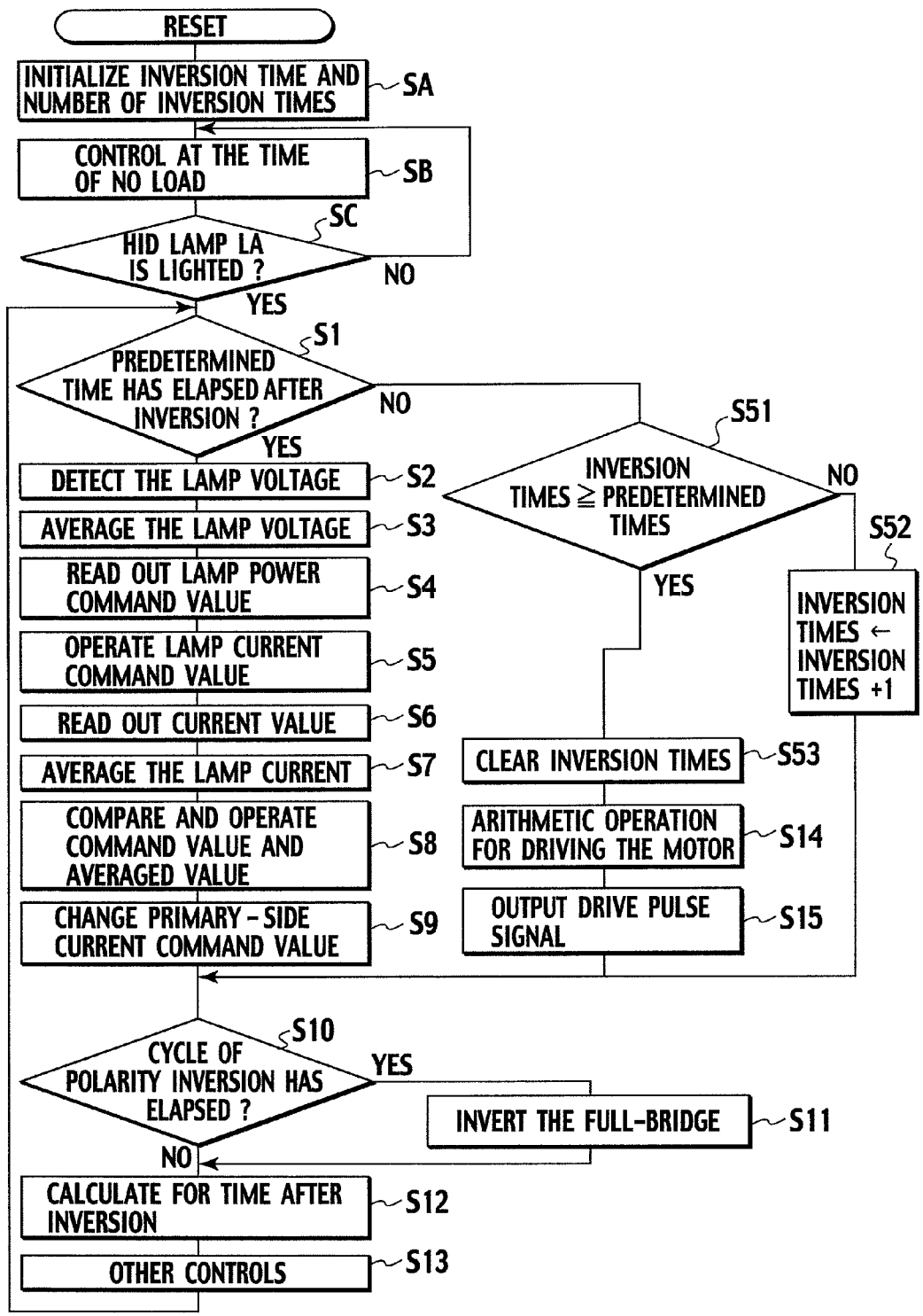
FIG. 16 is a flowchart showing microcomputer operations of a fifth embodiment of the present invention.

As opposed to this, as shown in FIG. 16, in the case of having determined in Step S1 that the predetermined time has not elapsed since the lamp voltage and the lamp current were inverted, a headlamp control apparatus 1 according to the fifth embodiment advances the processing to Step S51, and determines whether or not the number of inversion times of the lamp voltage and the lamp current has exceeded the predetermined number of times. In the case where it is determined that the number of inversion times of the lamp voltage and the lamp current has not exceeded the predetermined number of times, a counted value of the number of inversions is counted up in Step S52, and the processing proceeds to Step S10.

Then, after the inversions of the lamp voltage and the lamp current in the full-bridge inverter 3 are performed the predetermined number of times, it is determined in Step S51 that the number of inversions of the lamp voltage and the lamp current has exceeded the predetermined number of times, and the number of inversion times is cleared to 1 in Step S53. Next, the headlamp control apparatus 1 performs the arithmetic operation for driving the motor M in Step S14, and changes the drive pulse in Step S15.

The headlamp control apparatus 1 in the fifth embodiment, which is as described above, becomes capable of freely selecting the drive pulse frequency of the motor M from among 2/n (n is an integer) of the square wave frequency for lighting the HID lamp La, and becomes capable of making a setting that corresponds to characteristics (accuracy/torque/drive speed) required for the motor M.

Figure 17:
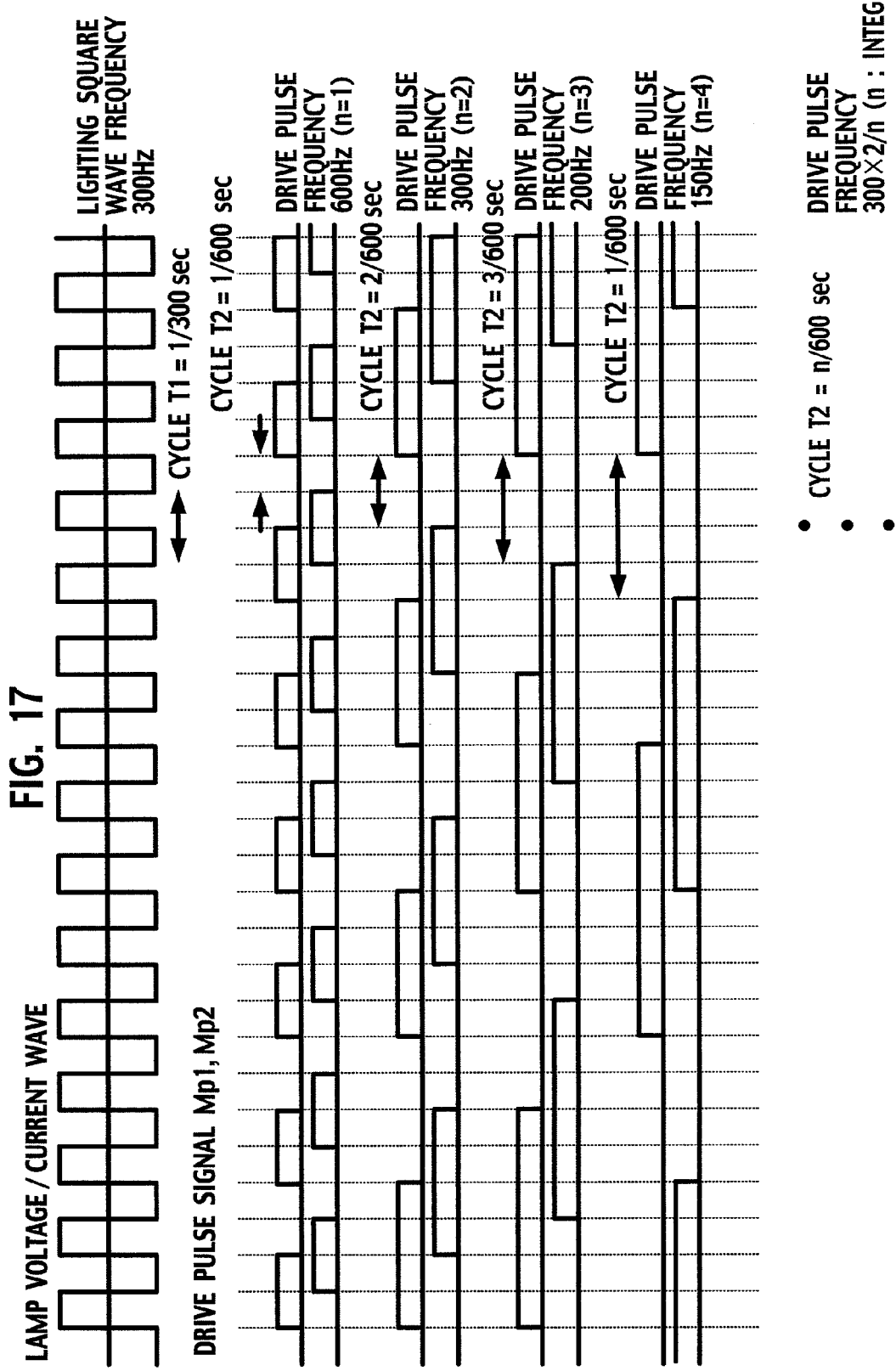
FIG. 17 is a waveform chart for explaining operations of the fifth embodiment of the present invention.

In FIG. 17, ranges are shown, in which the drive pulse frequency of the motor M can be set in the case where 300 Hz is selected as the square wave frequency for lighting the common HID lamp La. In this case, it becomes possible to set the frequency of the drive pulse of the motor M at 600 Hz, 300 Hz, 200 Hz, 150 Hz, 120 Hz, 100 Hz, 85.7 Hz, 75 Hz . . . .

As described above, the pulse frequency for driving the motor M can be set only discretely. Accordingly, as shown in FIG. 18, such an inversion cycle of the lamp voltage and the lamp current, which is determined in Step S10 of FIG. 16, is changed to any of 500 Hz, 700 Hz, 900 Hz and 1 kHz, as well as 300 Hz. In such a way, it becomes possible to increase values at which the drive pulse frequency of the motor M can be set. In the HID lamp La, if the duty ratio of the square wave lighting is 50%, then this does not cause depletion of only one of the electrodes, and accordingly, no problem occurs even if the inversion frequency of the square wave is changed in response to the drive pulse of the motor M.

Moreover, also with regard to the cycles of the control for the other lamps, the transmission processing for the lamp state, the data reading by the A/D conversion and the control for the leveling actuator 120 in the second to fourth embodiments which are mentioned above, ranges in which the cycles concerned are set can be widened by similar controls.

Sixth Embodiment

Next, a description is made of a sixth embodiment to which the present invention is applied. Note that the same reference numerals and the same step numbers are assigned to the same portions as those of the above-mentioned embodiments of the invention, whereby a detailed description thereof is omitted. Note that the sixth embodiment is described with reference to the configurations shown in the first and second embodiments.

In the fifth embodiment, the drive pulse of the motor M is changed in the case where the polarity inversions of the square waves supplied to the HID lamp La have reached the predetermined number of times. A headlamp control apparatus 1 according to the sixth embodiment sets the predetermined number of times concerned in response to a difference (motor difference) between the target position of the motor drive and the current motor position every time when the drive pulse of the motor M is changed.

Figure 19:
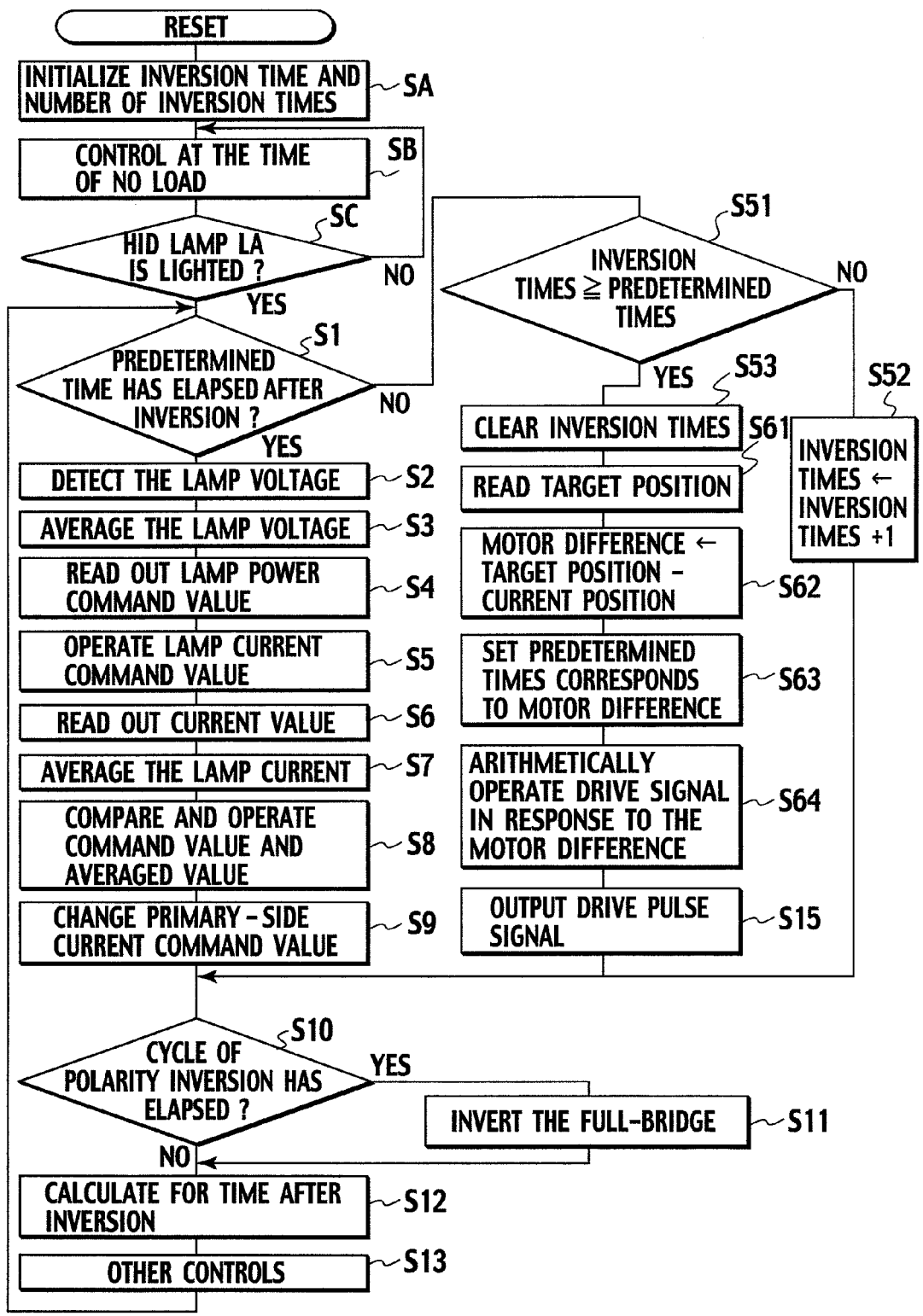
FIG. 19 is a flowchart showing microcomputer operations of a sixth embodiment of the present invention.

As shown in FIG. 19, a microcomputer 10 converts the processing of Step S14 described above into Step S61 to Step S64, and changes the predetermined number of times, which is compared with the number of inversion times in Step S51, every time when the motor drive pulse is outputted. A description of a flowchart is made below.

In Step S61, the target position of the motor drive is read.

In Step S62, the current position of the motor M is subtracted from the target position read in Step S61, whereby the motor difference is arithmetically operated.

In Step S63, the predetermined number of times of the number of inversion times, which corresponds to the motor difference arithmetically operated in Step S62, is set.

In Step S64, the way of changing the drive signal of the motor M for controlling the light distribution is arithmetically operated in response to the motor difference arithmetically operated in Step S62. For example, it is arithmetically operated whether the light is to be directed rightward or leftward.

Figure 20:
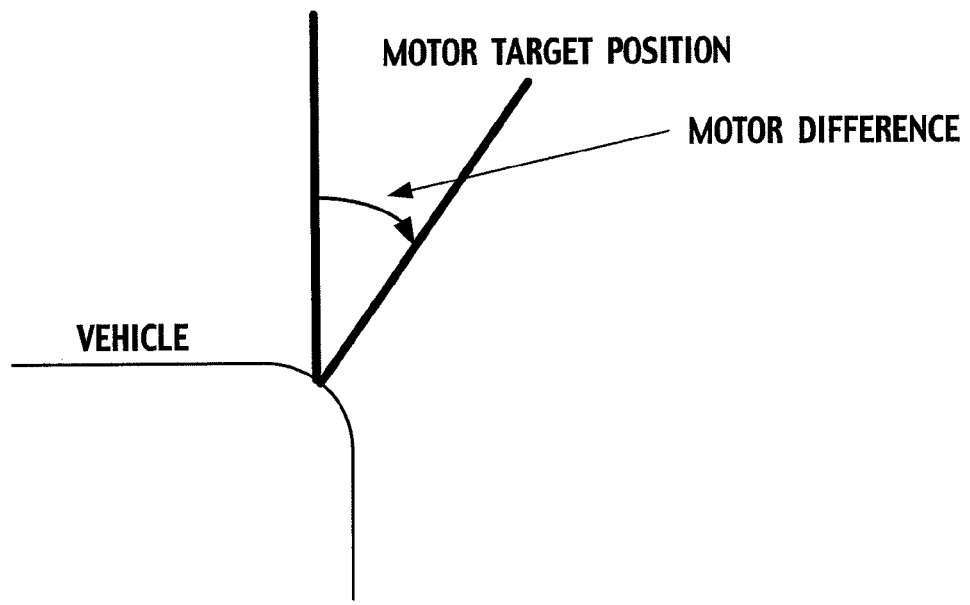
FIG. 20 is an explanatory view showing a concept of a motor difference of the sixth embodiment of the present invention.
Figure 21:
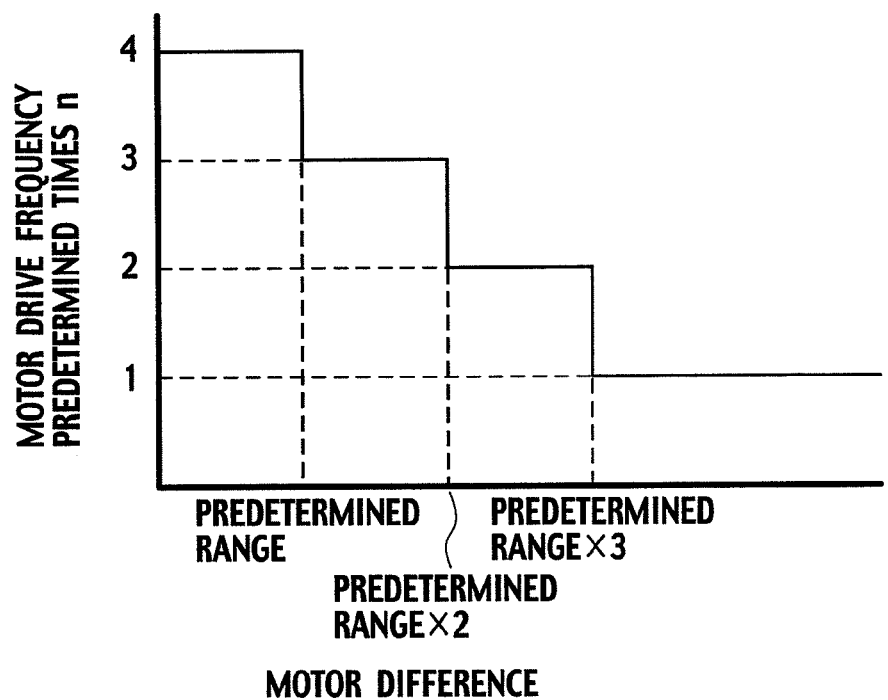
FIG. 21 is a characteristic diagram for explaining operations of the sixth embodiment.

In FIG. 20, an explanatory view of a concept of the motor difference is shown, and in FIG. 21, a table is shown, which decides the predetermined number: n for deciding a motor drive frequency corresponding to the motor difference. The table of FIG. 21 is based on the case of varying the predetermined number: n for deciding the motor drive frequency to 1, 2, 3, 4 (n=1, 2, 3, 4).

In accordance with this embodiment, the drive frequency of the motor M can be varied by the difference between such a target motor position and the current motor position, and in the case where the motor difference is small, the drive frequency can be retained in the slowest state (n=4 in this embodiment). Moreover, only in the case where it takes a longer time until the motor reaches the target position since the motor difference is large, the motor drive speed can be increased by increasing the drive frequency.

The larger the drive frequency of the motor M is, the larger the load applied to the microcomputer 10 becomes. Therefore, expect the case where the motor difference is large and a high speed operation of the motor M is required, the headlamp control apparatus 1 of this embodiment can realize a low-speed drive of the motor M, thus making it possible to reduce the processing load for the motor drive, which is applied to the microcomputer 10.

Target positions to which the motors M1 and M2 in FIG. 1 are to be driven are predecided in response to the steering angle that is based on a steering operation in the vehicle. For example, the case is considered, which is of driving, to the right, both of the irradiation ranges of the left and right HID lamps La1 and La2 in the vehicle when the steering is steered to the right. In this case, the right-side HID lamp La2 is driven at a large angle in order to irradiate a place ahead of a corner. However, if the left-side HID lamp La1 is driven at the same angle as that for the right-side HID lamp La2, then light in the forward direction is decreased. Therefore, it is general that the driving angle of the left-side HID lamp La1 is made smaller than that of the right-side HID lamp La2. At this time, if the motors M1 and M2 for controlling the light distributions of the left and right HID lamps La1 and La2 are driven at the same angular velocity, then timing when the motors M1 and M2 reach the target positions becomes shifted between the left and right HID lamps La1 and La2, and this gives a driver a feeling of wrongness. Accordingly, a relationship between the motor difference and the motor drive frequency is set as in FIG. 21, whereby a time taken until the motor M1 reaches the target position and a time taken until the motor M2 reaches the target position can be made substantially equivalent to each other, and the motors M1 and M2 can be driven without giving the driver the feeling of wrongness.

The relationship in FIG. 21 is represented as in the following formula. When the maximum value of the predetermined number of times n, which decides the motor drive frequency, is defined as K, the motor is driven under a condition where n is equal to K in the case where the motor difference is less than a predetermined range, and such a motor drive conforms to the following numerical formula as the motor difference becomes larger.

$$i \times \text{predetermined range} \leq \text{motor difference} < (i+1) \times \text{predetermined range}$$

When the above formula is satisfied, the motor is operated at a motor drive frequency represented as: n=K−i.

Note that i in the above formula is an integer, and the maximum value thereof is K−2. In the case where i becomes equal to K−1, the motor is operated at a motor drive frequency corresponding to n=1 when the motor difference is a product: (K−1)×(predetermined range), or more.

In this embodiment, the drive frequency of the motor M is arithmetically operated based on the difference between the target motor position and the current motor position. However, it is possible to obtain a similar effect even if a control is performed by arithmetically operating a variable angular velocity of the target motor position and a variable angular velocity of the steering angle in place of the above-described difference (in the case where the variable angular velocity is large, the difference between the target position of the motor drive and the current motor position is large).

Seventh Embodiment

Next, a description is made of a seventh embodiment to which the present invention is applied. Note that the same reference numerals and the same step numbers are assigned to the same portions as those of the above-mentioned embodiments of the invention, whereby a detailed description thereof is omitted. Note that the seventh embodiment is described with reference to the configurations shown in FIG. 1 and FIG. 2.

Figure 22:
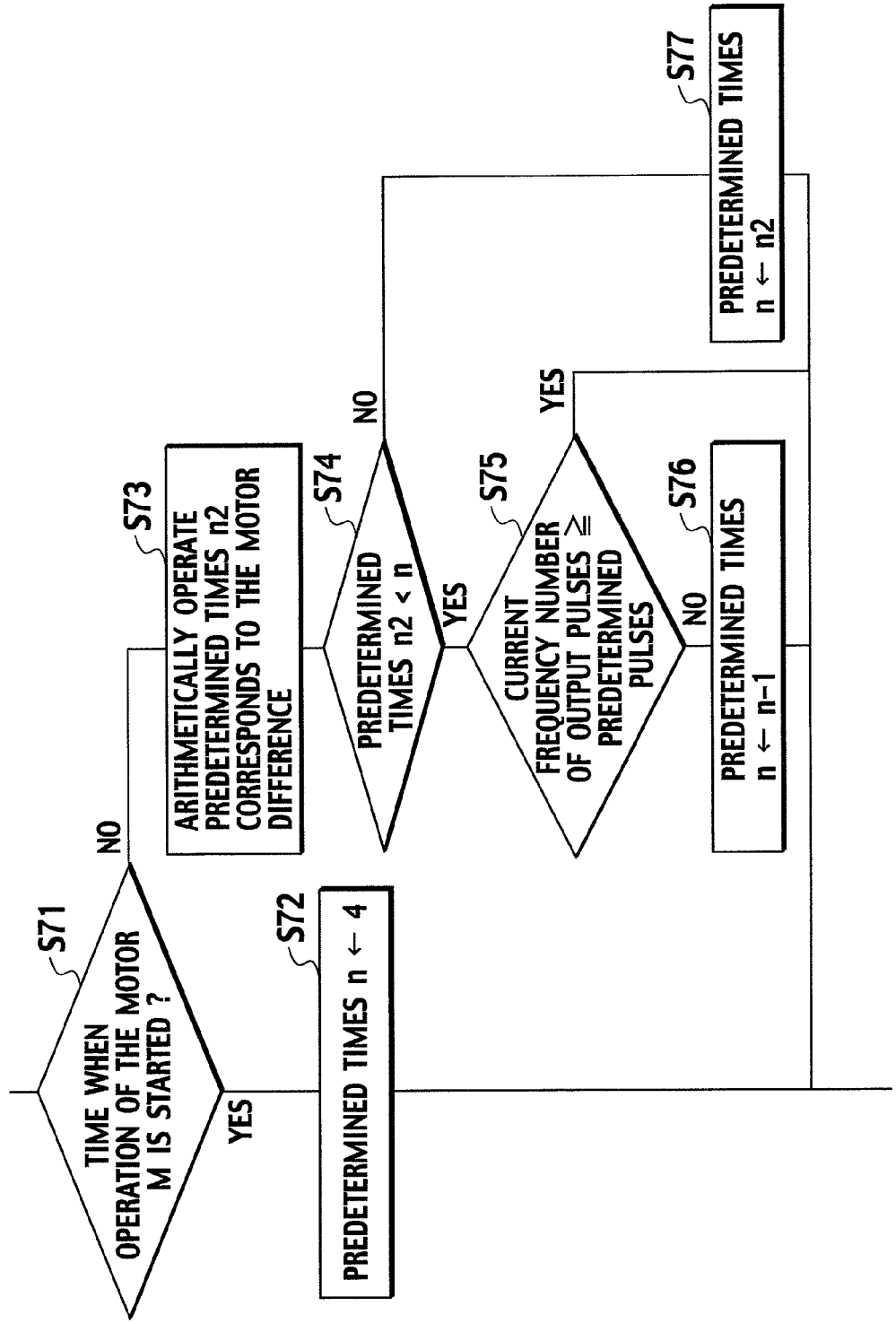
FIG. 22 is a flowchart showing changed spots of microcomputer operations of a seventh embodiment of the present invention.

In FIG. 22, a main flow of a microcomputer 10 of the seventh embodiment is shown. A headlamp control apparatus 1 according to the seventh embodiment performs processing of FIG. 22 in Step S63 of the sixth embodiment. A changed point from the sixth embodiment is as follows. In the sixth embodiment, in the processing of Step S63, the predetermined number of times n (1 to 4), which decides the motor drive pulse frequency in response to the motor difference, is set. In the seventh embodiment, even in the case where the motor difference is large, the motor is set to be driven at the lowest frequency at the time when the motor operation is started, and thereafter, the motor drive frequency is increased step by step (to the drive frequency arithmetically operated based on the motor difference) after the predetermined number of pulses is outputted.

The microcomputer 10 of this headlamp control apparatus 1 determines in Step S71 whether or not it is a time when the operation of the motor M is started, and if it is the time when the operation is started, assigns 4 to the predetermined number of times n. Specifically, the drive pulse frequency of the motor M is set at the minimum value, and the operation of the motor M is started. In the case where it is not the time when the operation of the motor M is started, then in Step S73, the predetermined number of times, which corresponds to the motor difference, is arithmetically operated, and is assigned to the predetermined number of times n2.

In Step S74, the predetermined number of times n2 and the current predetermined number of times n are compared with each other, and in the case where the predetermined number of times n2 is the predetermined number of times n or more, the predetermined number of times n2 is assigned to the predetermined number of times n in Step S77. Specifically, in the case where the drive pulse frequency is larger than the frequency arithmetically operated from the motor difference, the drive pulse frequency is reduced.

In the case where the predetermined number of times n2 is less than the current predetermined number of times n as a result of comparing the predetermined number of times n2 and the current predetermined number of times n with each other, then in Step S75, it is determined whether or not the number of pulses outputted at the current frequency is the predetermined number of pulses or more. In the case where the predetermined number or more of pulses is outputted, then in Step S76, the predetermined number of times n is reduced by 1. In such a way, the motor drive frequency is increased.

Figure 23:
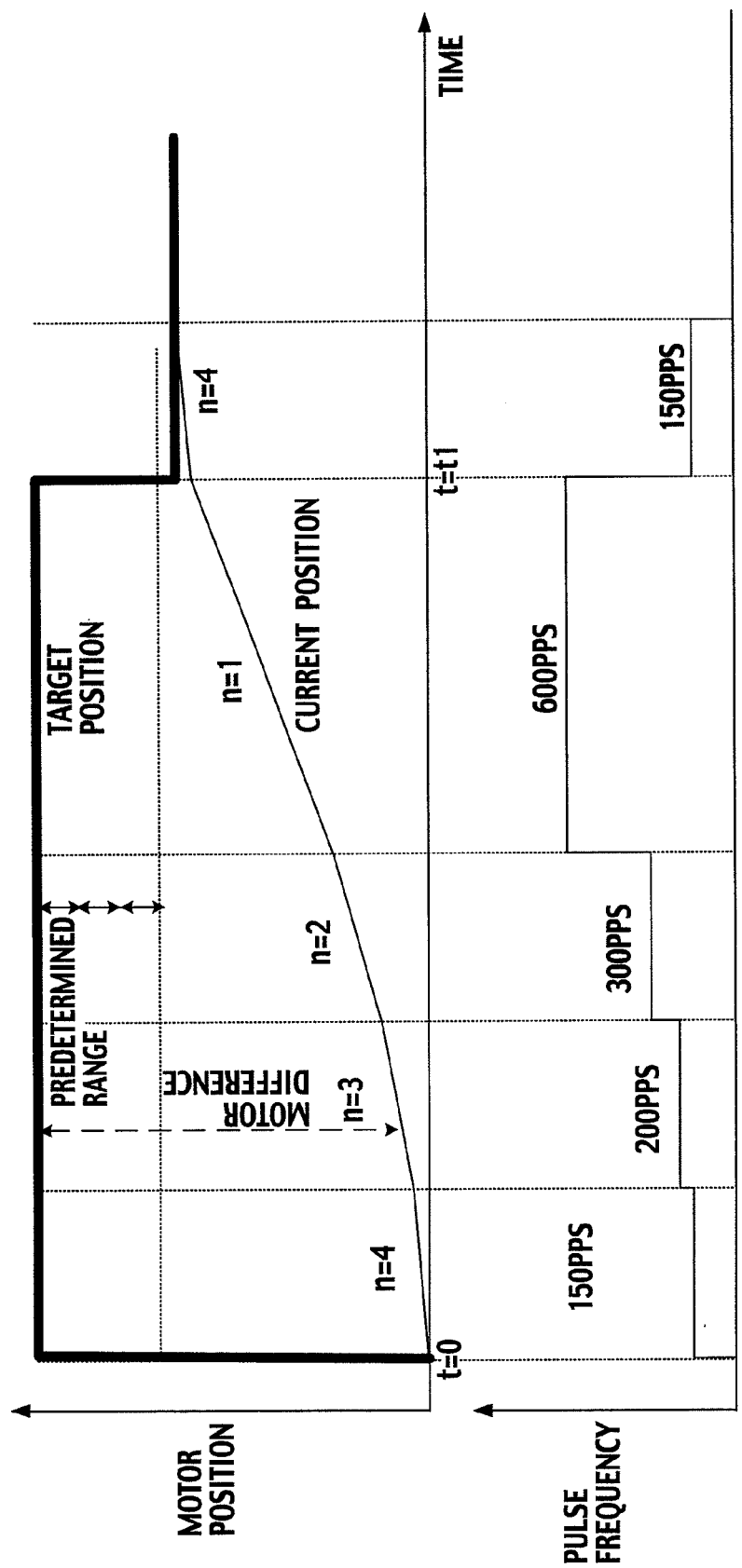
FIG. 23 is an operation explanatory diagram of a basic example of the seventh embodiment of the present invention.

In FIG. 23, operations according to a control method of this embodiment are shown. There are shown changes of the motor drive pulse frequency and changes of the current position, which are caused thereby, in the case where the target position is changed at a time t=0 and the target position is further changed at a time t=t1.

In the operations of the sixth embodiment, the motor drive pulse frequency is varied in response to the motor difference. Hence, at the time t=0 when the target position is changed, the motor difference becomes larger than 3×predetermied range, and the motor is driven at the maximum frequency at n=1 in view of the motor drive pulse frequency. Meanwhile, by the control in this embodiment, the control to increase the pulse frequency step by step is realized.

By performing the above-described control, it becomes possible to realize slow-up of the motor M while realizing the division of the load applied to the microcomputer 10, and an increase of torque at the time when the operation of the motor M is started and a smooth operation of the motor M can be realized. In addition, the frequency at the time when the operation of the motor is started is lowered, whereby the load on the microcomputer 10 at the time when the operation of the motor M is started, in which the load on the microcomputer 10 is large, can be reduced.

Figure 24:
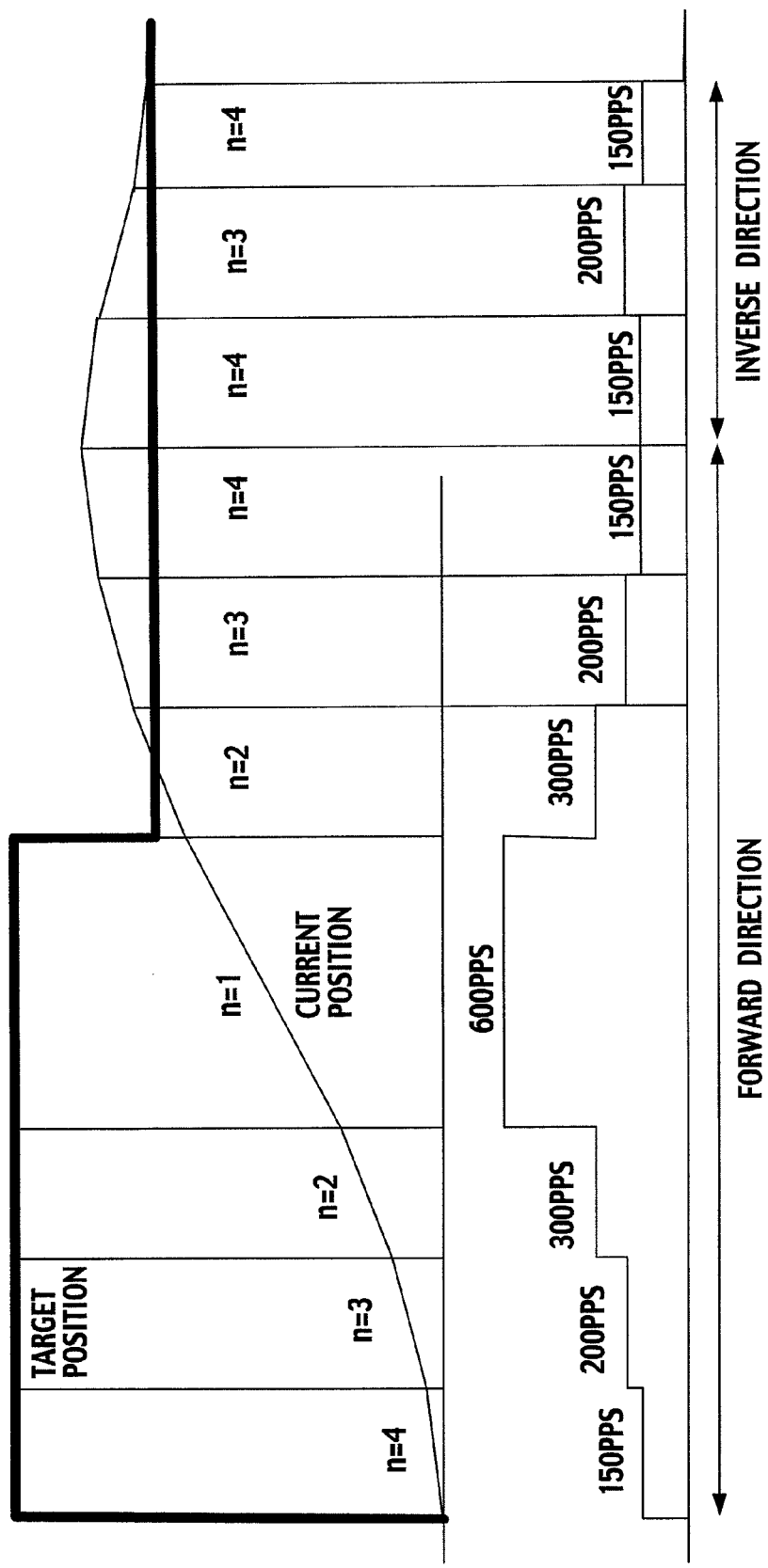
FIG. 24 is an operation explanatory diagram of one modification example of the seventh embodiment of the present invention.

Moreover, needless to say, also in the case where the drive pulse frequency of the motor M is reduced by increasing the predetermined number of times n, a similar control is performed (once the drive pulse frequency is increased, the drive pulse frequency is reduced step by step even if the motor M reaches the target position), whereby it also becomes possible to realize slow-down of the motor M, and further, the smooth operation of the motor M can be realized. Operations in this case are shown in FIG. 24.

Eighth Embodiment

Next, a description is made of an eighth embodiment to which the present invention is applied. Note that the same reference numerals and the same step numbers are assigned to the same portions as those of the above-mentioned embodiments of the invention, whereby a detailed description thereof is omitted. Note that the eighth embodiment is described with reference to the configurations shown in FIG. 1 and FIG. 2.

Figure 25:
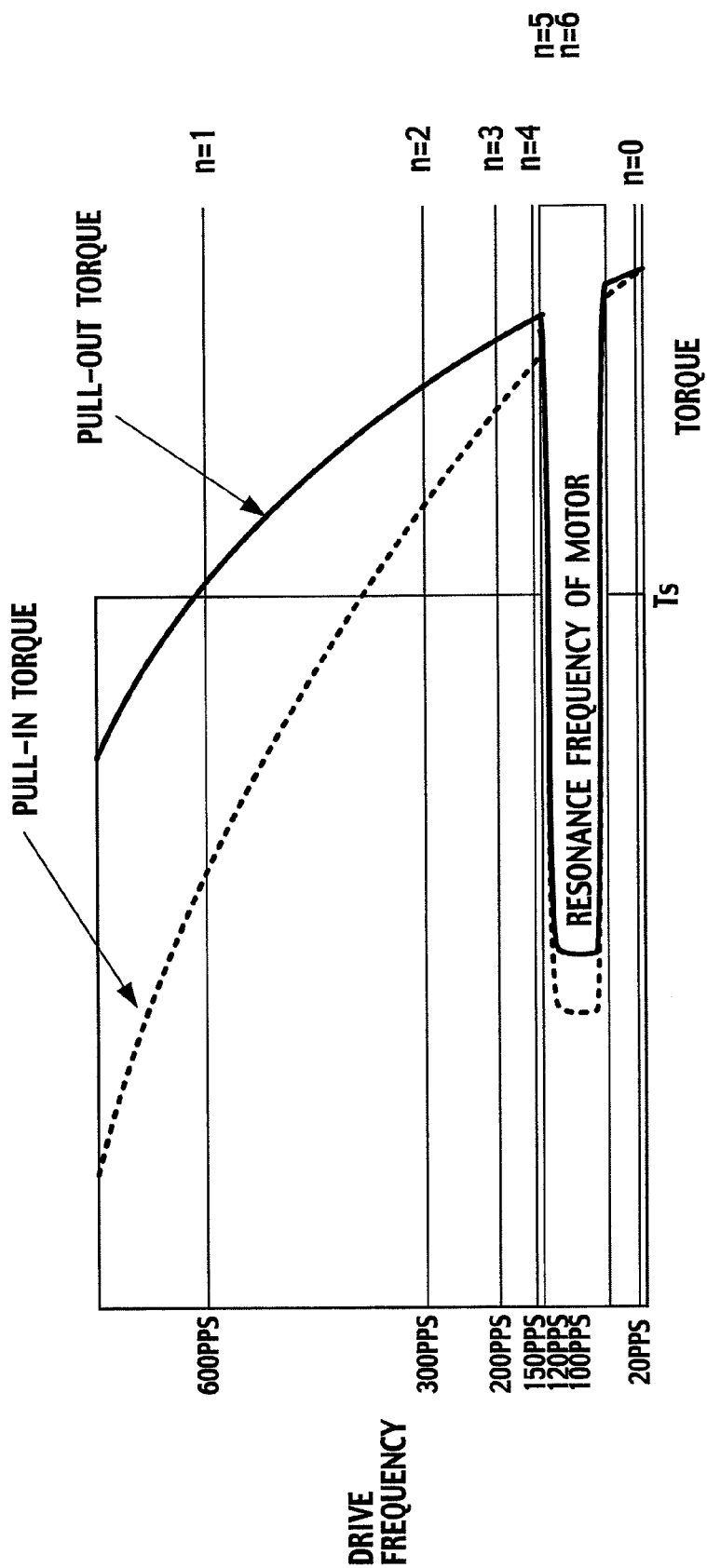
FIG. 25 is a characteristic diagram showing of a motor for use in an eighth embodiment of the present invention.

In FIG. 25, characteristics of a motor M for use in this embodiment are shown. A headlamp control apparatus 1 for use is similar to that of the seventh embodiment. In this embodiment, the case is described, where the polarity inversion frequency of the square wave for lighting the HID lamp La is 300 Hz. The motor M is used, in which pull-out torque (maximum torque with respect to the frequency which the stably operating motor M can output) of the motor for use at 600 PPS that is twice the frequency of the square wave becomes substantially the same value as that of torque Ts necessary to drive a mechanical system.

Moreover, a setting is made, in which pull-in torque (maximum torque with respect to the frequency at which the motor M can start to operate) is larger, at the lowest frequency, than torque Ts necessary to drive the mechanical system. In this embodiment, the maxim value of the predetermined number of times n that the polarity inversion of the square wave is counted is set as: n=4 (corresponding to 150 PPS). With regard to the setting of the maximum value of the predetermined number of times n, the maximum value is set at a value at which a natural resonant frequency band inherent in the motor M is avoided. Specifically, the maximum value of the predetermined number of times n is set at 4, and n=5 and n=6 are not used, thus making it possible to avoid using the resonant frequency band of the motor M.

The motor M and the headlamp control apparatus 1 in this embodiment are combined with each other, whereby a range where the drive pulse frequency of the motor M can be selected, the range being able to be set in the headlamp control apparatus, is widened to the largest extent, and the smooth control for the motor M can be realized more.

Moreover, in this embodiment, the maximum value of the predetermined number of times n that the polarity inversion of the square wave of the headlamp control apparatus 1 is counted is set at 4. This maximum value is predecided since the natural resonant frequency band of the motor M is present. In this connection, a value on a lower frequency side below the resonant frequency band may be set as the maximum value of the predetermined number of times n, and may be used while avoiding a frequency in the resonant frequency band. For example, 20 PPS under n=30, and the like may be used.

Ninth Embodiment

Next, a description is made of a ninth embodiment to which the present invention is applied. Note that the same reference numerals and the same step numbers are assigned to the same portions as those of the above-mentioned embodiments of the invention, whereby a detailed description thereof is omitted.

Figure 26:
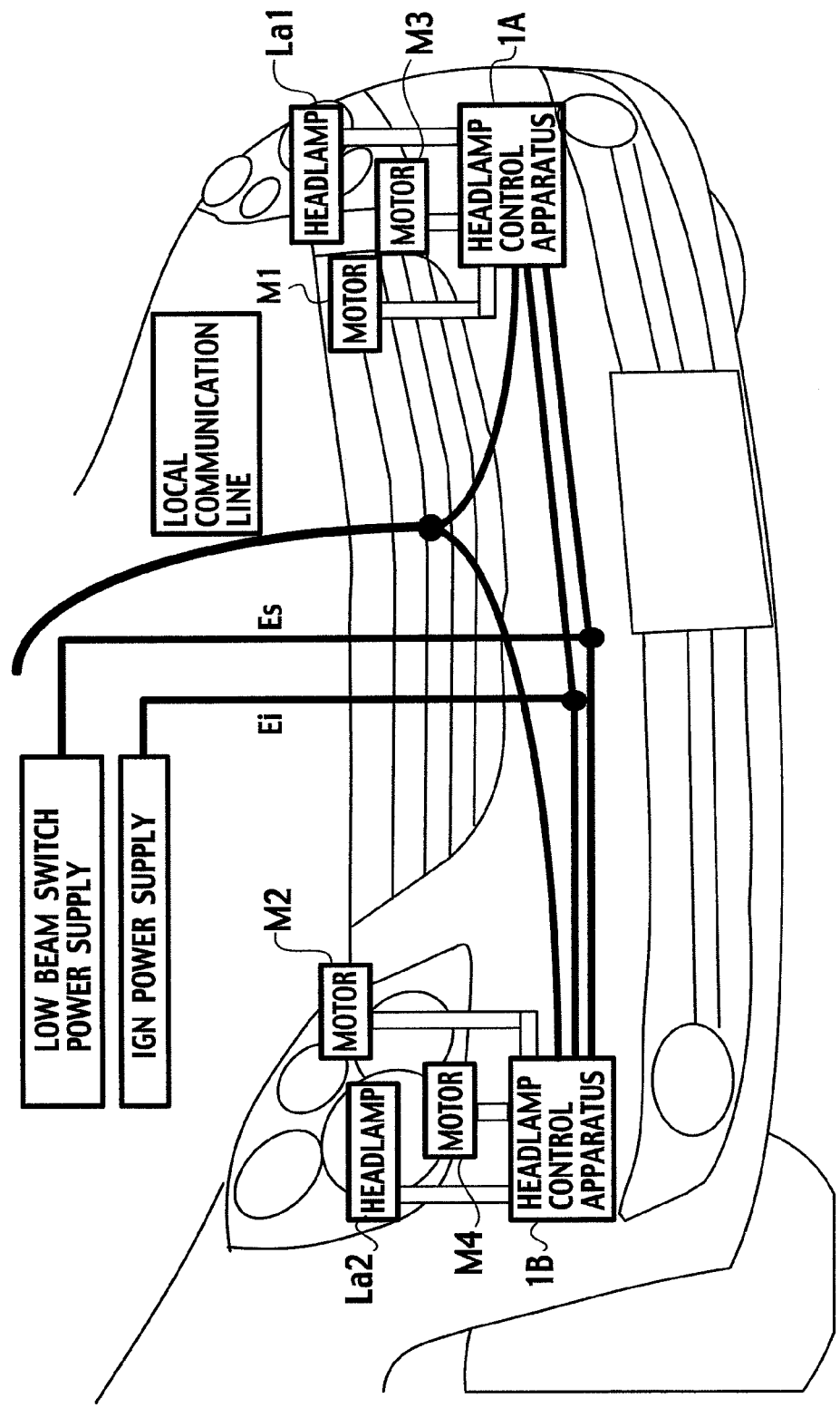
FIG. 26 is a schematic configuration view showing vehicle headlamps of ninth embodiment of the present invention.
Figure 27:
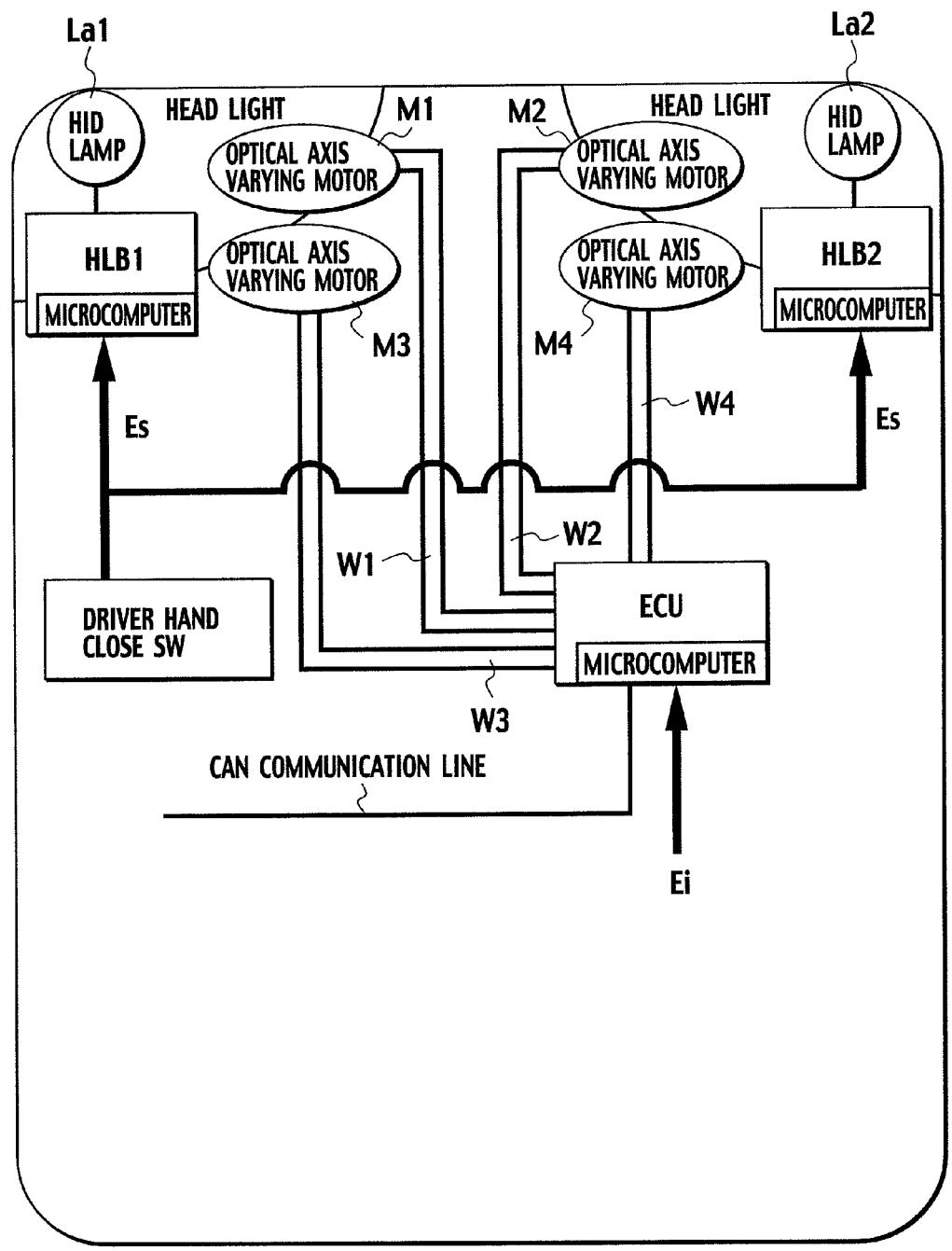
FIG. 27 is a configuration diagram of a first conventional example.

In FIG. 26, vehicle headlamps are shown, which mount thereon the headlamp control apparatuses 1 or the HID lamp control apparatuses 100 in any of the above-mentioned first to eight embodiments. In this view, reference numerals 1A and 1B denote the head lamp control apparatuses, reference numerals La1 and La2 denote the HID lamp La1 and the HID lamp La2, which are the headlamps, respectively, reference numeral Es denotes the power turned ON/OFF by the switch located close to the driver, and reference numeral Ei denotes the power linked with the ignition. The headlamp control apparatuses 1A and 1B acquire the information on the motor target positions by the LIN communication as the local communication, and drive the motors M1 to M4 of the left and right HID lamps La1 and La2. By this embodiment, the headlamps which can be controlled free from such a feeling of wrongness that the left and light distribution operations are completed at different timings can be realized more easily at low cost.

INDUSTRIAL APPLICABILITY

In accordance with the present invention, the communication control, the vehicle information acquisition (A/D conversion) and the drive control for the motor can be implemented in synchronization with the sample hold time after the inversion of the square wave, while the arithmetic operation load necessary for the lighting control for the high intensity discharge lamp is becoming relatively lightened. Accordingly, the arithmetic operation load on the microcomputer, which is necessary for the lighting control for the high intensity discharge lamp, can be temporally divided from the communication control, the vehicle information acquisition (A/D conversion) and the arithmetic operation load on the microcomputer, which is for controlling the drive of the motor. In such a way, a high-performance high intensity discharge lamp control system can be realized by using the inexpensive microcomputer.

Moreover, in accordance with the present invention, the drive of the motor and the like are implemented every time when the inversion of the square wave is counted the predetermined number of times, whereby it becomes possible to set the drive cycle and the like. Moreover, the predetermined number of times that the inversion of the square wave is counted is varied in response to the vehicle situation, whereby the smooth motor control can be realized. In the case where a finer motor drive control becomes required, such a motor drive control can be realized by varying the square wave inversion cycle of the HID lamp.

Note that the application of the present invention is not limited to the vehicle HID lamp. The common HID lamp is also lighted by using the square wave. Accordingly, in the case of simultaneously performing the load control such as the motor control also in the lighting device of the common HID lamp, a similar effect can be obtained by implementing similar means to those of the present invention.

The invention claimed is:

1. A vehicle headlamp control apparatus which:
receives a direct current voltage;
lights a discharge lamp by a square wave; and
drives at least one motor,
wherein the square wave for lighting the discharge lamp and a pulse for driving the motor are synchronized to operate with each other at the same time.

2. The vehicle headlamp control apparatus according to claim 1, wherein an arithmetic operation for driving the motor is performed within a predetermined time after polarity inversion of the square wave.

3. The vehicle headlamp control apparatus according to claim 2, wherein the predetermined time is made substantially constant regardless of a state of the motor.

4. The vehicle headlamp control apparatus according to claim 1, wherein a pulse frequency for driving the motor is set to be 2/n (n is an integer) times a frequency of the square wave for lighting the discharge lamp.

5. The vehicle headlamp control apparatus according to claim 4, wherein the pulse frequency for driving the motor is reduced as a motor difference that is a difference between a target position for driving the motor and a current position of the motor is smaller.

6. The vehicle headlamp control apparatus according to claim 5, wherein the pulse frequency is controlled so that a time taken until the motor reaches the target position can become substantially the same between left and right motors of a vehicle.

7. The vehicle headlamp control apparatus according to claim 5, wherein the pulse frequency for driving the motor is set while avoiding a resonant frequency band of the motor.

8. The vehicle headlamp control apparatus according to claim 5, wherein, at a time of starting an operation of the motor, the motor is driven while setting the drive pulse frequency of the motor at a minimum value, and the drive pulse frequency is increased step by step in a case where the motor difference is large.

9. The vehicle headlamp control apparatus according to claim 5, wherein, at a time of stopping the operation of the motor, the drive pulse frequency of the motor is reduced step by step, and the operation is stopped after driving the motor at the minimum value.

10. A vehicle headlamp control system comprising:
the vehicle headlamp control apparatus according to claim 5,
wherein, in the vehicle headlamp control apparatus, a maximum operable frequency of the motor is set to be twice the frequency of the square wave for lighting the discharge lamp.

11. A vehicle headlamp, wherein the vehicle headlamp mounts thereon the vehicle headlamp control apparatus according to claim 1.

12. A high intensity discharge lamp lighting apparatus which:
receives a direct current voltage; and
lights a high intensity discharge lamp by a square wave,
the high intensity discharge lamp control apparatus comprising:
a device for performing a drive control for at least one load other than the high intensity discharge lamp,
wherein the control for the load is synchronized to operate with the square wave for lighting the high intensity discharge lamp at the same time.

13. The high intensity discharge lamp control apparatus according to claim 12,
wherein the load is at least one light source, and
the square wave for lighting the high intensity discharge lamp is synchronized with lighting or extinguishing of the light source.

14. The high intensity discharge lamp control apparatus according to claim 12,
wherein the load is communication device, and
transmission processing of the communication device is synchronized with the square wave for lighting the high intensity discharge lamp.

15. The high intensity discharge lamp control apparatus according to claim 14,
wherein the transmission processing stands for transmission of a lighting state of the high intensity discharge lamp, and
processing in which the communication device transmits the lighting state of the high intensity discharge lamp is synchronized with the square wave for lighting the high intensity discharge lamp.

16. The high intensity discharge lamp control apparatus according to claim 12,
wherein the load is at least one sensor that reads vehicle state information, and
processing in which the sensor reads the vehicle state information is synchronized with the square wave for lighting the high intensity discharge lamp.

17. The high intensity discharge lamp control apparatus according to claim 12,
wherein the load is at least one motor, and
the square wave for lighting the high intensity discharge lamp and a pulse for driving the motor are synchronized with each other.

18. The high intensity discharge lamp control apparatus according to claim 17, wherein an arithmetic operation for driving the motor within a predetermined time from polarity inversion of the square wave is performed in synchronization with the polarity inversion.

19. The high intensity discharge lamp control apparatus according to claim 18, wherein the predetermined time is made substantially constant regardless of a state of the motor.

20. The high intensity discharge lamp control apparatus according to claim 17, wherein a pulse frequency for driving the motor is set to be 2/n (n is an integer) times a frequency of the square wave for lighting the high intensity discharge lamp.

21. The high intensity discharge lamp control apparatus according to claim 20, wherein the pulse frequency for driving the motor is reduced as a motor difference that is a difference between a target position for driving the motor and a current position of the motor is smaller.

22. The high intensity discharge lamp control apparatus according to claim 21, wherein the pulse frequency is controlled so that a time taken until the motor reaches the target position can become substantially the same between left and right motors of a vehicle.

23. The high intensity discharge lamp control apparatus according to claim 21, wherein the pulse frequency for driving the motor is set while avoiding a resonant frequency band of the motor.

24. The high intensity discharge lamp control apparatus according to claim 21, wherein, at a time of starting an operation of the motor, the motor is driven while setting the drive pulse frequency of the motor at a minimum value, and the drive pulse frequency is increased step by step in a case where the motor difference is large.

25. The high intensity discharge lamp control apparatus according to claim 21, wherein, at a time of stopping the operation of the motor, the drive pulse frequency of the motor is reduced step by step, and the operation is stopped after driving the motor at the minimum value.

26. The high intensity discharge lamp control apparatus according to claim 21, wherein a frequency of a square wave for driving the high intensity discharge lamp is changed in response to a set value of the drive frequency of the motor.

27. A high intensity discharge lamp control system comprising:
the high intensity discharge lamp control apparatus according to claim 20,
wherein, in the high intensity discharge lamp control apparatus, a maximum operable frequency of the motor is set to be twice the frequency of the square wave for lighting the high intensity discharge lamp.

28. A vehicle headlamp, wherein the vehicle headlamp mounts thereon the vehicle headlamp control apparatus according to claim 12.

* * * * *